United States Patent
Ferrés et al.

(10) Patent No.: US 10,902,558 B2
(45) Date of Patent: Jan. 26, 2021

(54) MULTISCALE DENOISING OF RAW IMAGES WITH NOISE ESTIMATION

(71) Applicant: GoPro, Inc., San Mateo, CA (US)

(72) Inventors: Matias Tassano Ferrés, Paris (FR); Thomas Nicolas Emmanuel Veit, Meudon (FR); Marc Lebrun, Issy-les-Moulineaux (FR); Julie Delon, Paris (FR)

(73) Assignee: GoPro, Inc., San Mateo, CA (US)

(*) Notice: Subject to any disclaimer, the term of this patent is extended or adjusted under 35 U.S.C. 154(b) by 221 days.

(21) Appl. No.: 15/983,330

(22) Filed: May 18, 2018

(65) Prior Publication Data

US 2019/0355098 A1 Nov. 21, 2019

(51) Int. Cl.
*G06K 9/40* (2006.01)
*G06T 5/00* (2006.01)
*G06T 3/40* (2006.01)

(52) U.S. Cl.
CPC ............ *G06T 5/002* (2013.01); *G06T 3/4015* (2013.01); *G06T 2207/10024* (2013.01); *G06T 2207/20224* (2013.01)

(58) Field of Classification Search
CPC .................. G06T 5/002; G06T 3/4015; G06T 2207/20224; G06T 2207/10024; G06T 2207/20016; G06T 5/20
See application file for complete search history.

(56) References Cited

U.S. PATENT DOCUMENTS

| | | | | |
|---|---|---|---|---|
| 9,639,935 | B1* | 5/2017 | Douady-Pleven | ... H04N 19/423 |
| 9,650,349 | B2* | 5/2017 | Kaplan | ..................... A61P 25/00 |
| 2011/0194763 | A1* | 8/2011 | Moon | ..................... G06T 5/002 |
| | | | | 382/167 |
| 2013/0258143 | A1* | 10/2013 | Wang | ..................... H04N 9/045 |
| | | | | 348/242 |
| 2014/0002697 | A1* | 1/2014 | Tai | ......................... H04N 5/357 |
| | | | | 348/242 |
| 2014/0333797 | A1* | 11/2014 | Kim | ......................... G09G 5/02 |
| | | | | 348/223.1 |

(Continued)

OTHER PUBLICATIONS

Mauricio Delbracio, Pablo Musé, Antoni Buades, Julien Chauvier, Nicholas Phelps, and Jean-Michel Morel. Boosting monte carlo rendering by ray histogram fusion. ACM Transactions on Graphics, 33(1):1-15, 2014.

(Continued)

*Primary Examiner* — Samir A Ahmed
(74) *Attorney, Agent, or Firm* — Young Basile Hanlon & MacFarlane, P.C.

(57) ABSTRACT

Implementations disclosed herein include an image capture device, a system, and a method for performing multiscale denoising of an image. An image processor of the image capture device obtains a first image. The first image may be in any format and may include noise artifacts. The image processor decomposes the first image into one or more sub-images. The sub-images may range from a coarse scale to a fine scale. In some implementations, the image processor iteratively denoises each of the one or more sub-images from the coarse scale to the fine scale. The image processor reconstructs the one or more denoised sub-images to produce a denoised image. A memory of the image capture device may be configured to store the denoised image.

20 Claims, 11 Drawing Sheets

(56) References Cited

U.S. PATENT DOCUMENTS

| | | | | |
|---|---|---|---|---|
| 2015/0055862 A1* | 2/2015 | Omayu | ............... | H04N 1/58 |
| | | | | 382/167 |
| 2016/0364841 A1* | 12/2016 | Douady-Pleven | ...... | G06T 5/002 |
| 2016/0366386 A1* | 12/2016 | Douady-Pleven | ..... | H04N 5/217 |
| 2017/0061585 A1* | 3/2017 | Cao | ........... | G06T 5/20 |
| 2017/0111652 A1* | 4/2017 | Davies | ............ | H04N 19/189 |
| 2017/0278224 A1* | 9/2017 | Onzon | ............... | G06T 5/002 |

OTHER PUBLICATIONS

Jun Ge and Gagan Mirchandani. Softening the multiscale product method for adaptive noise reduction. In Signals, Systems and Computers, 2004. Conference Record of the Thirty-Seventh Asilomar Conference on, vol. 2, pp. 2124-2128. IEEE, 2003.

Marc Hensel, Bjorn Eiben, and Thomas Pralow. Evolution of Uncorrelated and Correlated Noise in Gaussian and Laplacian Image Pyramids. (x):71-76, 2007.

Antoni Buades, Bartomeu Coll, and Jean-Michel J.-M. Morel. A non-local algorithm for image denoising. Computer Vision and Pattern Recognition, 2005. CVPR 2005. IEEE Computer Society Conference on, 2(0):60-65 vol. 2, 2005.

Antoni Buades, Bartomeu Coll, and Jean-Michel Morel. Non-Local Means Denoising, 2011. (http://dx.doi.org/10.5201/ipol.2011.bcm.nlm) (5 pages).

M Lebrun, M Colom, A Buades, and J M Morel. Secrets of image denoising cuisine. Acta Numerica, 21:475-576, 2012.

\* cited by examiner

MULTISCALE DENOISING OF RAW IMAGES WITH NOISE ESTIMATION

TECHNICAL FIELD

This disclosure relates to denoising systems and methods in image processing.

BACKGROUND

Typical denoising methods rely on a good estimation of the noise existent in the input images, such that the more precise the input noise model is, the better the denoising algorithms will perform. Accurate noise models exist for raw images at the output of camera sensors. Nevertheless, depending on the architecture of the image processing pipe, several processing operations may be performed between the acquisition of the raw image and its denoising process. It is then vital to correctly update, according to the mathematical transformations the raw image goes through, the noise model at the output of the image sensor into the processing pipe until it reaches the denoising operation.

On the other hand, typical patch-based denoising algorithms cannot cope with low-frequency noise, which is particularly noticeable in the eyes of the viewer. Patch-based methods fail at getting rid of long-wavelength noise, as large structures cannot be captured by small patches. A possible approach to dealing with low-frequency noise is to apply a multiscale decomposition to the image and progressively denoise its scales. Because of the downsampling process involved in multiscaling, noise will decrease at coarser scales, which facilitates the task of the denoising algorithms. In addition, the relative sizes of the neighborhoods will widen in coarser scales due to subsampling, which allows the capture and removal of low-frequency noise in larger regions. The main difficulty involved in multiscale image denoising is related to the estimation of the noise in all the scales of the multiscale decomposition. This is mainly due to the subsequent correlation of spatially neighboring pixels in order to construct each scale of the decomposition.

SUMMARY

Implementations disclosed herein include a method for denoising an image. The image may be a raw image or an image in any format that includes noise artifacts. The method may include transforming the image from a misaligned to a centered image. The misaligned image may be a four-channel image. The four-channel image may be a Bayer scale image. The centered image may be a three-channel image that has an RGB color space. The method may include multiplying each channel of the centered image by a respective weight to adjust a white balance of the centered image. The method may include transforming the RGB color space to a YCbCr color space to produce a color transformed image.

The method may further include performing multiscale denoising on the color space transformed image. For example, the multiscale denoising may include decomposing the color transformed image into a plurality of sub-images. The plurality of sub-images may range from a coarse scale to a fine scale. The multiscale denoising may include iteratively denoising each of the plurality of sub-images, and the denoising may be performed from the coarsest scale to the finest scale. The multiscale denoising may also include reconstructing the plurality of denoised sub-images to produce a denoised image.

The method may further include transforming the YCbCr color space of the denoised image to the RGB color space to produce an inverse color space transformed image. Additionally, the method may include transforming the inverse color space transformed image to a Bayer scale image.

Some implementations of the method may include upscaling each of the plurality of sub-images. Some implementations of the method may also include determining one or more respective details for each of the plurality of sub-images. The details for each sub-image may be determined by subtracting a respective upscaled sub-image from the color space transformed image. In some implementations, the method may include combining each of the one or more respective details with a respective upscaled sub-image of an adjacent scale. The adjacent scale may be the next coarsest scale with respect to the current scale. In some implementations, the combining may be performed prior to iteratively denoising each of the plurality of sub-images.

Implementations disclosed herein include an image capture device. The image capture device includes an image processor and a memory. The image processor may be configured to obtain a first image. The first image may be in any format and may include noise artifacts. The image processor may be configured to decompose the first image into one or more sub-images. The sub-images may range from a coarse scale to a fine scale. In some implementations, the image processor may be configured to iteratively denoise each of the one or more sub-images from the coarse scale to the fine scale. The image processor may also be configured to reconstruct the one or more denoised sub-images to produce a denoised image. The memory of the image capture device may be configured to store the denoised image.

In some implementations, the image processor of the image capture device may be configured to upscale each of the one or more sub-images. In some implementations, the image processor may be configured to determine one or more respective details for each of the one or more sub-images by subtracting a respective upscaled sub-image from the first image. The image processor may be further configured to combine each of the respective one or more details with a respective upscaled sub-image of an adjacent scale. The adjacent scale may be a coarser scale than the present scale. In some implementations, the image processor may be configured to combine each of the respective one or more details with the respective upscaled sub-image prior to denoising each of the one or more sub-images.

Implementations disclosed herein include an image capture device. The image capture device may include an image processor and a memory. The image processor may be configured to obtain an image. The image may be referred to as an input image and may be in any suitable format; for example, the image may be a raw image. The image may include noise artifacts.

In some implementations, the image processor may transform the image from a misaligned image to a centered image. The misaligned image may be a four-channel image. The centered image may be a three-channel image that has an RGB color space. The image processor may be configured to determine a first noise estimate based on the input image and the centered image. The image processor may be configured to multiply each channel of the centered image by a respective weight to adjust a white balance of the centered image.

In some implementations, the image processor may be configured to determine a second noise estimate based on the centered image and the white balance adjusted image.

The image processor may further be configured to transform the RGB color space to a YCbCr color space to produce a color transformed image.

In some implementations, the image processor may be configured to determine a third noise estimate based on the white balance adjusted image and the color transformed image. The image processor may further be configured to decompose the color transformed image into one or more sub-images. The one or more sub-images may range from a coarse scale to a fine scale. The image processor may be configured to determine a respective noise estimate for each of the one or more sub-images. Each respective noise estimate may be based on an image at a present scale and an image of an adjacent scale.

The image processor may be further configured to denoise each of the one or more sub-images. The image processor may denoise each of the one or more sub-images iteratively from the coarse scale to the fine scale. The image processor may be configured to reconstruct the one or more denoised sub-images to produce a denoised image. In some implementations, the image processor may be configured to transform the YCbCr color space of the denoised image to the RGB color space to produce an inverse color space transformed image. The image processor may be configured to transform the inverse color space transformed image to a Bayer scale image. The image capture device may store the Bayer scale image in the memory of the image capture device.

In some implementations, the image processor may be further configured to combine the first noise estimate, the second noise estimate, and the third noise estimate with each of the respective noise estimates and each respective sub-image. The combination of the noise estimates with each respective sub-image may be performed prior to denoising at each scale.

In some implementations, the image processor may be further configured to upscale each of the one or more sub-images. In some implementations, the image processor may be further configured to determine one or more respective details for each of the one or more sub-images by subtracting a respective upscaled sub-image from the color transformed image. The image processor may be further configured to combine each of the respective one or more details with a respective upscaled sub-image of an adjacent scale. The adjacent scale may be a coarser scale. In some implementations, the image processor may be configured to combine each of the respective one or more details with the respective upscaled sub-image prior. The combining of the respective one or more details with the respective upscaled sub-image may be performed prior to denoising each of the one or more sub-images at each scale.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

In the embodiments disclosed herein, protected microphone systems may include dampeners, a protective layer, or a combination thereof to minimize the vibration sensitivity of a microphone of the protected microphone systems. The dampeners may be constructed of a foam material, a thin metal material, or any suitable material that is pliable and configured to absorb vibration energy. The protective layer may be a membrane, a mesh, or any suitable material. The protective layer may be air permeable or non-air permeable.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

Figure 1:
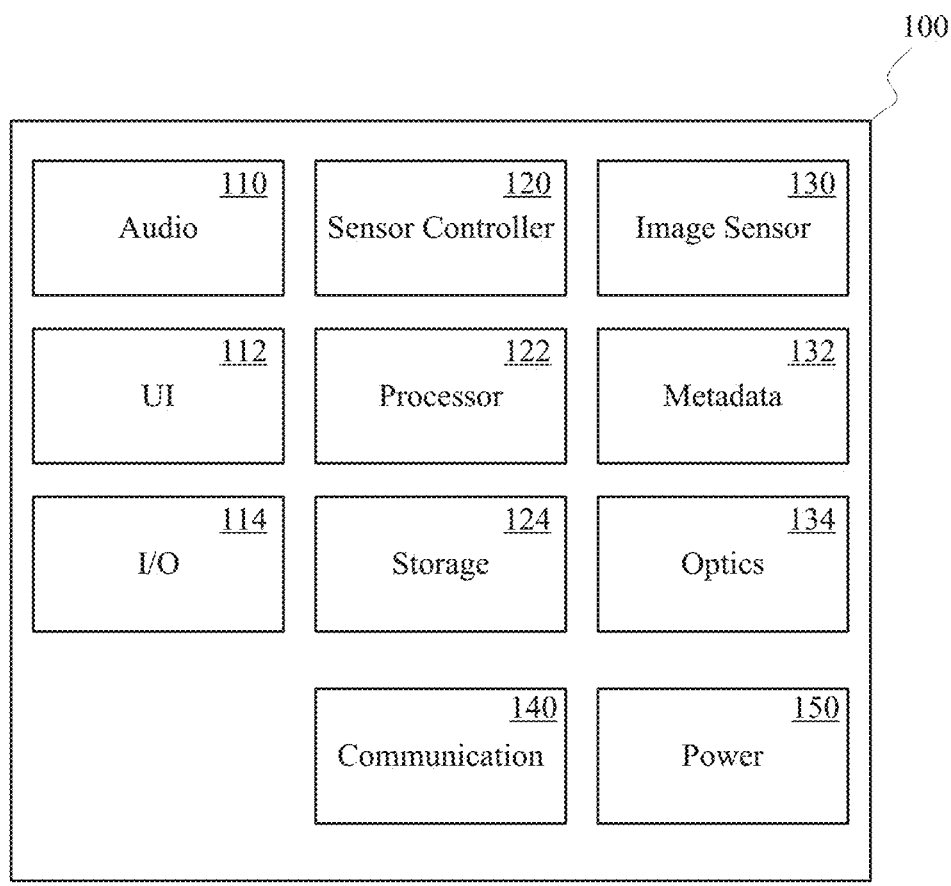
FIG. 1 is a diagram of an example of an image capture device.

FIG. 1 is a diagram of an example of an image capture device 100. In some implementations, an image capture device 100 may be an action camera that includes an audio component 110, a user interface (UI) unit 112, an input/output (I/O) unit 114, a sensor controller 120, a processor 122, an electronic storage unit 124, an image sensor 130, a metadata unit 132, an optics unit 134, a communication unit 140, a power system 150, or a combination thereof.

In some implementations, the audio component 110, which may include a microphone, may receive, sample, capture, record, or a combination thereof, audio information, such as sound waves. The audio information may be associated with, or stored in association with, image or video content contemporaneously captured by the image capture device 100. In some implementations, audio information may be encoded using, for example, Advanced Audio Coding (AAC), Audio Compression—3 (AC3), Moving Picture Experts Group Layer-3 Audio (MP3), linear Pulse Code Modulation (PCM), Moving Picture Experts Group—High efficiency coding and media delivery in heterogeneous environments (MPEG-H), and/or other audio coding formats or codecs. In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 112 may include one or more units that may register or receive input from and/or present outputs to a user, such as a display, a touch interface, a proximity-sensitive interface, a light receiving/emitting unit, a sound receiving/emitting unit, a wired/wireless unit, and/or other units. In some implementations, the user interface unit 112 may include a display, one or more tactile elements (such as buttons and/or virtual touchscreen buttons), lights (LEDs), speakers, and/or other user interface elements. The user interface unit 112 may receive user input and/or provide information to a user related to the operation of the image capture device 100.

In some implementations, the user interface unit 112 may include a display unit that presents information related to camera control or use, such as operation mode information, which may include image resolution information, frame rate information, capture mode information, sensor mode information, video mode information, photo mode information, or a combination thereof; connection status information, such as connected, wireless, wired, or a combination thereof; power mode information, such as standby mode information, sensor mode information, video mode information, or a combination thereof; information related to other information sources, such as heart rate information, global positioning system information, or a combination thereof; and/or other information.

In some implementations, the user interface unit 112 may include a user interface component, such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation; a number of button presses, which may be pulse code modulation; or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations, such as one or more short or long button presses, may also be implemented.

In some implementations, the I/O unit 114 may synchronize the image capture device 100 with other cameras and/or with other external devices, such as a remote control, a second image capture device, a smartphone, a user interface device, and/or a video server. The I/O unit 114 may communicate information between I/O components. In some implementations, the I/O unit 114 may be connected to the communication unit 140 to provide a wired and/or wireless communications interface (e.g., a Wi-Fi interface, a Bluetooth interface, a USB interface, an HDMI interface, a Wireless USB interface, an NFC interface, an Ethernet interface, a radio frequency transceiver interface, and/or other interfaces) for communication with one or more external devices (e.g., a mobile device) or another metadata source. In some implementations, the I/O unit 114 may interface with LED lights, a display, a button, a microphone, speakers, and/or other I/O components. In some implementations, the I/O unit 114 may interface with an energy source, such as a battery, and/or a Direct Current (DC) electrical source.

In some implementations, the I/O unit 114 of the image capture device 100 may include one or more connections to external computerized devices for configuration and/or management of remote devices, as described herein. The I/O unit 114 may include any of the wireless or wireline interfaces described herein, and/or may include customized or proprietary connections for specific applications.

In some implementations, the sensor controller 120 may operate or control the image sensor 130, such as in response to input, such as user input. In some implementations, the sensor controller 120 may receive image and/or video input from the image sensor 130 and may receive audio information from the audio component 110.

In some implementations, the processor 122 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the image capture device 100. In some implementations, the processor 122 may interface with the sensor controller 120 to obtain and process sensory information, such as for object detection, face tracking, stereo vision, and/or other image processing.

In some implementations, the sensor controller 120, the processor 122, or both may synchronize information received by the image capture device 100. For example, timing information may be associated with received sensor data, and metadata information may be related to content, such as images or videos, captured by the image sensor 130 based on the timing information. In some implementations, the metadata capture may be decoupled from video/image capture. For example, metadata may be stored before, after, and in-between the capture, processing, or storage of one or more video clips and/or images.

In some implementations, the sensor controller 120, the processor 122, or both may evaluate or process received metadata and may generate other metadata information. For example, the sensor controller 120 may integrate received acceleration information to determine a velocity profile for the image capture device 100 concurrently with recording a video. In some implementations, video information may include multiple frames of pixels and may be encoded using an encoding method, such as H.264, H.265, CineForm, and/or other codecs.

Although not shown separately in FIG. 1, one or more of the audio component 110, the user interface unit 112, the I/O unit 114, the sensor controller 120, the processor 122, the electronic storage unit 124, the image sensor 130, the metadata unit 132, the optics unit 134, the communication unit 140, or the power systems 150 of the image capture device 100 may communicate information, power, or both with one or more other units, such as via an electronic communication pathway, such as a system bus. For example, the processor 122 may interface with the audio component 110, the user interface unit 112, the I/O unit 114, the sensor controller 120, the electronic storage unit 124, the image sensor 130, the metadata unit 132, the optics unit 134, the communication unit 140, or the power systems 150 via one or more driver interfaces and/or software abstraction layers. In some implementations, one or more of the units shown in FIG. 1 may include a dedicated processing unit, memory unit, or both (not shown). In some implementations, one or more components may be operable by one or more other control processes. For example, a global positioning system receiver may include a processing apparatus that may provide position and/or motion information to the processor 122 in accordance with a defined schedule, such as values of latitude, longitude, and elevation at 10 Hz.

In some implementations, the electronic storage unit 124 may include a system memory module that may store executable computer instructions that, when executed by the processor 122, perform various functionalities, including those described herein. For example, the electronic storage unit 124 may be a non-transitory computer-readable storage medium, which may include executable instructions, and a processor, such as the processor 122, may execute an instruction to perform one or more, or portions of one or more, of the operations described herein. The electronic storage unit 124 may include storage memory for storing content, such as metadata, images, audio, or a combination thereof, captured by the image capture device 100.

In some implementations, the electronic storage unit 124 may include non-transitory memory for storing configuration information and/or processing code for video information and metadata capture, and/or to produce a multimedia stream that may include video information and metadata in accordance with the present disclosure. In some implementations, the configuration information may include capture type, such as video or still image; image resolution; frame rate; burst setting; white balance; recording configuration, such as loop mode; audio track configuration; and/or other parameters that may be associated with audio, video, and/or metadata capture. In some implementations, the electronic storage unit 124 may include memory that may be used by other hardware/firmware/software elements of the image capture device 100.

In some implementations, the image sensor 130 may include one or more of a charge-coupled device sensor, an active pixel sensor, a complementary metal-oxide-semiconductor sensor, an N-type metal-oxide-semiconductor sensor, and/or another image sensor or combination of image sensors. In some implementations, the image sensor 130 may be controlled based on control signals from a sensor controller 120.

The image sensor 130 may sense or sample light waves gathered by the optics unit 134 and may produce image data or signals. The image sensor 130 may generate an output signal conveying visual information regarding the objects or other content corresponding to the light waves received by the optics unit 134. The visual information may include one or more of an image, a video, and/or other visual information.

In some implementations, the image sensor 130 may include a video sensor, an acoustic sensor, a capacitive sensor, a radio sensor, a vibrational sensor, an ultrasonic sensor, an infrared sensor, a radar sensor, a Light Detection and Ranging (LIDAR) sensor, a sonar sensor, or any other sensory unit or combination of sensory units capable of detecting or determining information in a computing environment.

In some implementations, the metadata unit 132 may include sensors, such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. In some implementations, the image capture device 100 may contain one or more other sources of metadata information, telemetry, or both, such as image sensor parameters, battery monitor, storage parameters, and/or other information related to camera operation and/or capture of content. The metadata unit 132 may obtain information related to the environment of the image capture device 100 and aspects in which the content is captured.

For example, the metadata unit 132 may include an accelerometer that may provide device motion information, including velocity and/or acceleration vectors representative of motion of the image capture device 100. In another example, the metadata unit 132 may include a gyroscope that may provide orientation information describing the orientation of the image capture device 100. In another example, the metadata unit 132 may include a global positioning system sensor that may provide global positioning system coordinates, time, and information identifying a location of the image capture device 100. In another example, the metadata unit 132 may include an altimeter that may obtain information indicating an altitude of the image capture device 100.

In some implementations, the metadata unit 132, or one or more portions thereof, may be rigidly coupled to the image capture device 100, such that motion, changes in orientation, or changes in the location of the image capture device 100 may be accurately detected by the metadata unit 132. Although shown as a single unit, the metadata unit 132, or one or more portions thereof, may be implemented as multiple distinct units. For example, the metadata unit 132 may include a temperature sensor as a first physical unit and a global positioning system unit as a second physical unit. In some implementations, the metadata unit 132, or one or more portions thereof, may be included in an image capture device 100 as shown or may be included in a physically separate unit operatively coupled to, such as in communication with, the image capture device 100.

In some implementations, the optics unit 134 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics components. In some implementations, the optics unit 134 may include a focus controller unit that may control the operation and configuration of the camera lens. The optics unit 134 may receive light from an object and may focus received light onto an image sensor 130. Although not shown separately in FIG. 1, in some implementations, the optics unit 134 and the image sensor 130 may be combined, such as in a combined physical unit, for example, a housing.

In some implementations, the communication unit 140 may be coupled to the I/O unit 114 and may include a component, such as a dongle, having an infrared sensor, a radio frequency transceiver and antenna, an ultrasonic transducer, and/or other communications interfaces used to send and receive wireless communication signals. In some implementations, the communication unit 140 may include a local (such as Bluetooth or Wi-Fi) and/or broad range (such as cellular Long Term Evolution (LTE)) communications interface for communication between the image capture device 100 and a remote device, such as a mobile device. The communication unit 140 may communicate using, for example, Ethernet, 802.11, worldwide interoperability for microwave access (WiMAX), Third Generation Partnership Project (3GPP), LTE, digital subscriber line (DSL), asynchronous transfer mode (ATM), InfiniBand, PCI Express Advanced Switching, and/or other communication technologies. In some implementations, the communication unit 140 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 140 may be represented using formats including one or more of hypertext markup language (HTML), extensible markup language (XML), and/or other formats. One or more exchanges of information between the image capture device 100 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 150 supply power to the image capture device 100. For example, for a small-sized, lower-power action camera, a wireless power solution, such as a battery, a solar cell, an inductive (such as contactless) power source, rectification, and/or other power supply, may be used.

Consistent with the present disclosure, the components of the image capture device 100 may be remote from one another and/or aggregated. For example, one or more sensor components may be distal from the image capture device 100. Multiple mechanical, sensory, or electrical units may be controlled by a learning apparatus via network/radio connectivity.

Figure 2:
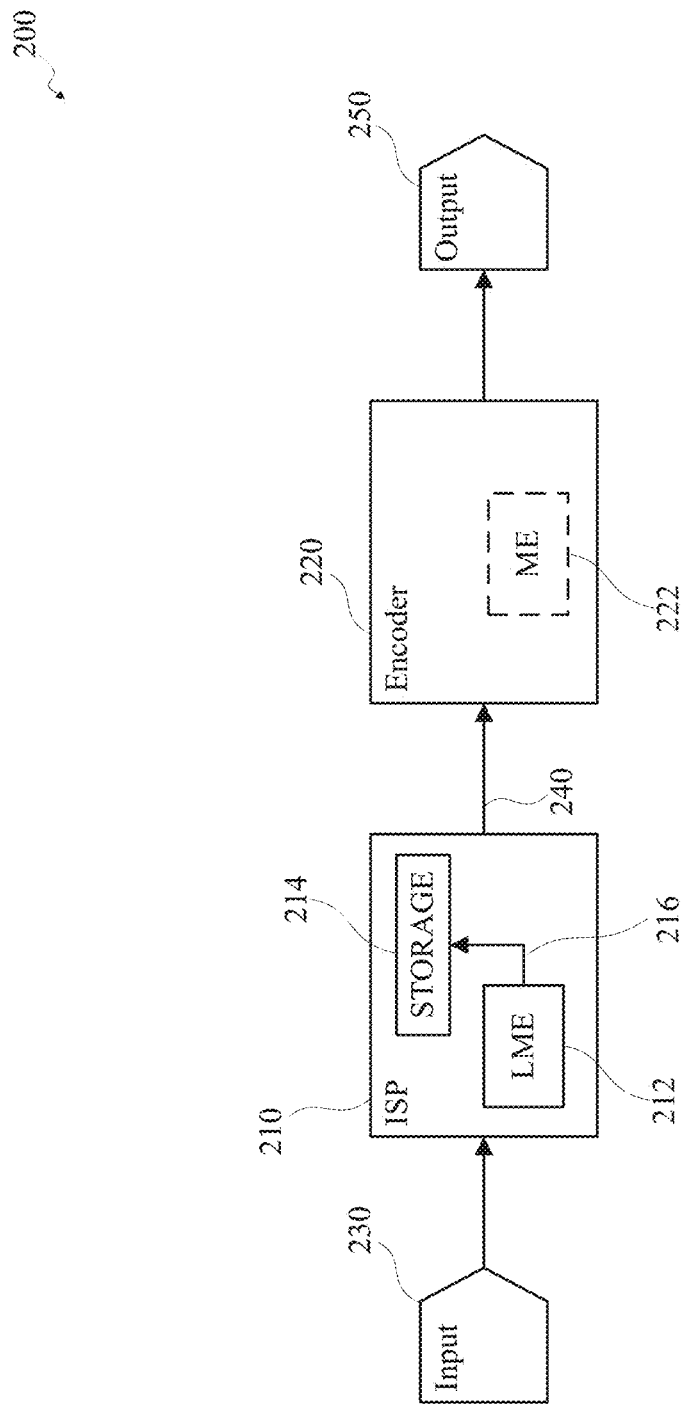
FIG. 2 is a diagram of an example of an image processing and coding pipe in accordance with implementations of this disclosure.

FIG. 2 is a block diagram of an example of an image processing and coding pipe 200 in accordance with implementations of this disclosure. In some implementations, the image processing and coding pipe 200 may be included in an image capture device, such as the image capture device 100 shown in FIG. 1. In some implementations, the image processing and coding pipe 200 may include an image signal processor (ISP) 210, an encoder 220, or a combination thereof.

In some implementations, the ISP 210 may receive an input image signal 230. For example, an image sensor (not shown), such as the image sensor 130 shown in FIG. 1, may capture an image, or a portion thereof, and may send, or transmit, the captured image or image portion to the ISP 210 as the input image signal 230. In some implementations, an image, or frame, such as an image or frame included in the input image signal, may be one of a sequence or series of images or frames of a video, such as a sequence or series of frames captured at a rate, or frame rate, which may be a number or cardinality of frames captured per a defined temporal period, such as 24, 30, or 60 frames per second.

In some implementations, the ISP 210 may include a local motion estimation (LME) unit 212, which may generate local motion estimation information for use in image signal processing and encoding, such as in correcting distortion, stitching, and/or motion compensation. In some implementations, the local motion estimation unit 212 may partition the input image signal 230 into blocks, such as blocks having 4×4, 16×16, 64×64, and/or other dimensions. In some implementations, the local motion estimation unit 212 may partition the input image signal 230 into arbitrarily shaped patches and/or individual pixels.

In some implementations, the local motion estimation unit 212 may compare pixel values of blocks of pixels between image frames, such as successive image frames, from the input image signal 230 to determine displacement, or movement, between frames. The local motion estimation unit 212 may produce motion vectors, such as an x component and y component of motion, at multiple locations within an image frame. The motion vectors may be represented by a translational model or other models that may approximate camera motion, such as rotation and translation in three dimensions, and zooming.

In some implementations, the ISP 210 of the image processing and coding pipe 200 may include electronic storage 214, such as memory, such as random-access memory (RAM), flash, or other types of memory. The electronic storage 214 may store local motion estimation information 216 determined by the local motion estimation unit 212 for one or more frames. The local motion estimation information 216 and associated image or images may be output 240 to the encoder 220. In some implementations, the electronic storage 214 may include a buffer, or cache, and may buffer the input image signal as an input, or source, image or frame.

In some implementations, the ISP 210 may output an image, associated local motion estimation information 216, or both as the output 240. For example, the image signal processor 210 may receive the input image signal 230, process the input image signal 230, and output a processed image as the output 240. Processing the input image signal 230 may include generating and using the local motion estimation information 216, spatiotemporal noise reduction (3DNR), dynamic range enhancement, local tone adjustment, exposure adjustment, contrast adjustment, image stitching, and/or other operations.

The encoder 220 may encode or compress the output 240 of the ISP 210. In some implementations, the encoder 220 may implement the one or more encoding standards, which may include motion estimation.

In some implementations, the encoder 220 may output encoded video as an encoded output 250. For example, the encoder 220 may receive the output 240 of the ISP 210, which may include processed images, the local motion estimation information 216, or both. The encoder 220 may encode the images and may output the encoded images as the encoded output 250.

In some implementations, the encoder 220 may include a motion estimation unit 222 that may determine motion information for encoding the image output 240 of the ISP 210. In some implementations, the encoder 220 may encode the image output 240 of the ISP 210 using motion information generated by the motion estimation unit 222 of the encoder 220, the local motion estimation information 216 generated by the local motion estimation unit 212 of the ISP 210, or a combination thereof.

For example, the motion estimation unit 222 may determine motion information at pixel block sizes that may differ from pixel block sizes used by the local motion estimation unit 212. In another example, the motion estimation unit 222 of the encoder 220 may generate motion information, and the encoder may encode the image output 240 of the image signal processor 210 using the motion information generated by the motion estimation unit 222 of the encoder 220 and the local motion estimation information 216 generated by the local motion estimation unit 212 of the image signal processor 210. In another example, the motion estimation unit 222 of the encoder 220 may use the local motion estimation information 216 generated by the local motion estimation unit 212 of the image signal processor 210 as input for efficiently and accurately generating motion information.

In some implementations, the image signal processor 210, the encoder 220, or (as shown) both may be distinct units. For example, the image signal processor 210 may include a motion estimation unit, such as the local motion estimation unit 212 as shown, and/or the encoder 220 may include a motion estimation unit, such as the motion estimation unit 222.

In some implementations, the image signal processor 210 may store motion information, such as the local motion estimation information 216, in a memory, such as the electronic storage 214, and the encoder 220 may read the motion information from the electronic storage 214 or otherwise receive the motion information from the image signal processor 210. The encoder 220 may use the motion estimation information determined by the ISP 210 for motion compensation processing.

Figure 3:
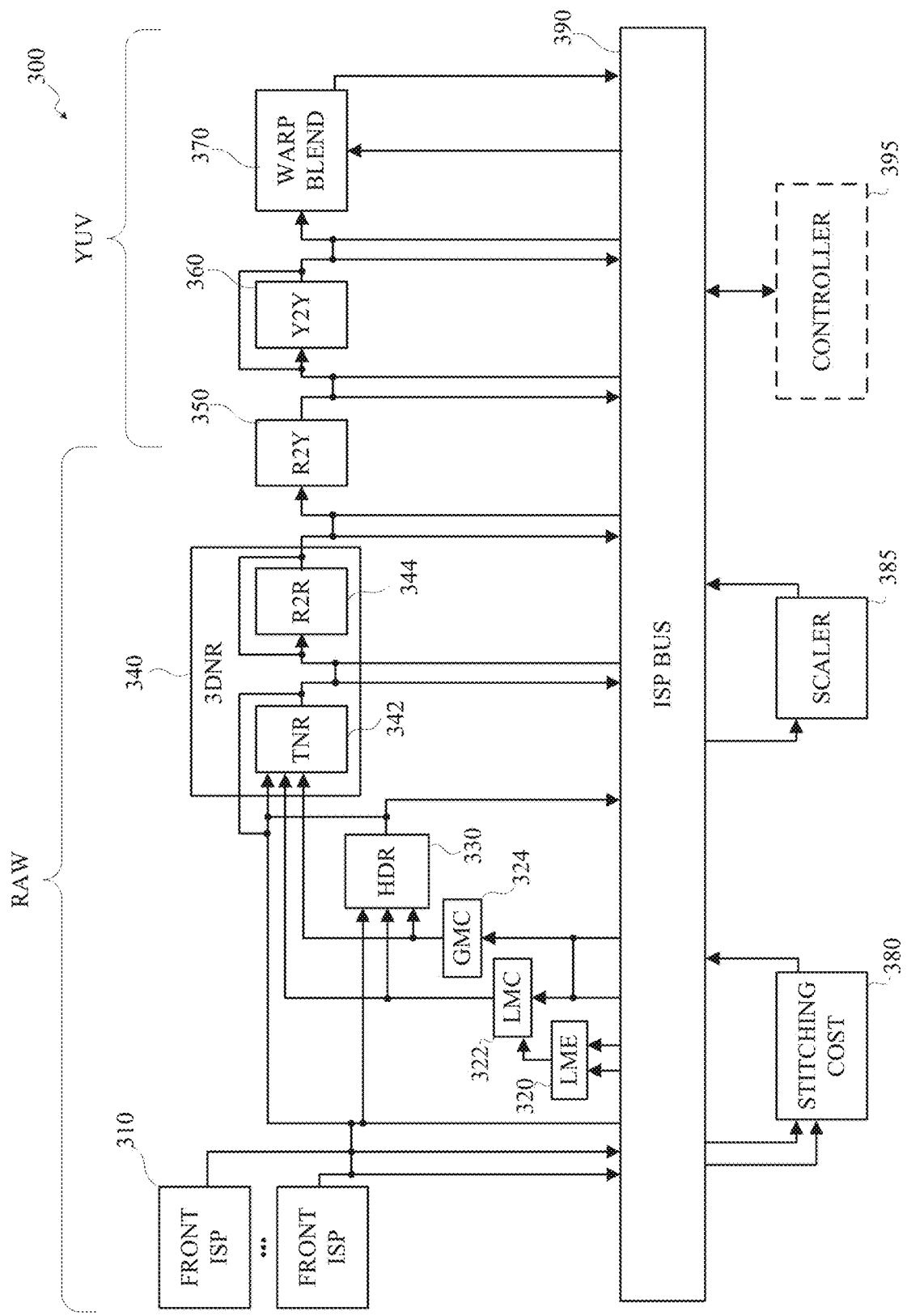
FIG. 3 is a diagram of an example of an image signal processor in accordance with implementations of this disclosure.

FIG. 3 is a functional block diagram of an example of an ISP 300 in accordance with implementations of this disclosure. An ISP 300 may be included in an image capture device, such as the image capture device 100 shown in FIG. 1. In some implementations, the ISP 300 may be similar to the ISP 210 shown in FIG. 2.

The ISP 300 may receive an image signal, such as from an image sensor (not shown), such as the image sensor 130 shown in FIG. 1, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein each pixel may be one of a combination of adjacent pixels, such as a combination of four adjacent pixels, of a Bayer pattern. For clarity, a sequence of pixels forming a Bayer pattern may be referred to herein as a Bayer. In some implementations, the ISP 300 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The ISP 300 may include a front ISP (Front ISP) 310, or multiple front ISPs as shown; a local motion estimation (LME) unit 320; a local motion compensation (LMC) unit 322; a global motion compensation (GMC) unit 324; a high dynamic range (HDR) unit 330; a three-dimensional noise reduction (3DNR) unit 340, which may include a temporal noise reduction (TNR) unit 342 and a raw to raw (R2R) unit 344; a raw to YUV (R2Y) unit 350; a YUV to YUV (Y2Y) unit 360; a warp and blend unit 370; a stitching cost unit 380; a scaler 385; an image signal processing bus (ISP BUS) 390; a configuration controller 395; or a combination thereof.

Although not shown expressly in FIG. 3, in some implementations, one or more of the front ISP 310, the local motion estimation unit 320, the local motion compensation unit 322, the global motion compensation unit 324, the high dynamic range unit 330, the three-dimensional noise reduction unit 340, the temporal noise reduction unit 342, the raw to raw unit 344, the raw to YUV unit 350, the YUV to YUV unit 360, the warp and blend unit 370, the stitching cost unit 380, the scaler 385, the image signal processing bus 390, the configuration controller 395, or any combination thereof, may include a respective clock, power domain, or both.

In some implementations, the front ISP 310 may minimally process image signals received from respective image sensors, which may include image scaling. Scaling, by the front ISP 310, may include processing pixels, such as a defined cardinality of pixels, corresponding to a determined quality. For example, the front ISP 310 may correct dead pixels, perform band processing, decouple vertical blanking, or a combination thereof. In some implementations, the front ISP 310 may output a high-resolution frame; one or more downscaled, or reduced, resolution frames, such as a $\frac{1}{2} \times \frac{1}{2}$ resolution frame, a $\frac{1}{4} \times \frac{1}{4}$ resolution frame, a $\frac{1}{8} \times \frac{1}{8}$ resolution frame, a $\frac{1}{16} \times \frac{1}{16}$ resolution frame, a $\frac{1}{32} \times \frac{1}{32}$ resolution frame; or any combination thereof.

In some implementations, a multiple-camera apparatus may include multiple image capture devices, such as the image capture device 100 shown in FIG. 1, and may include a respective front ISP 310 associated with each image capture device.

The local motion estimation unit 320 may receive, or otherwise access, an input frame, or one or more portions thereof, which may be a current input frame, such as via the image signal processing bus 390. In some implementations, the local motion estimation unit 320 may receive the current input frame at a downscaled, or reduced, resolution. In some implementations, such as implementations implementing high dynamic range image processing, the current input frame may be a long exposure input frame.

The local motion estimation unit 320 may receive, or otherwise access, a reference frame, or one or more portions thereof, such as via the image signal processing bus 390. The reference frame may be a previously generated motion compensated prior frame, which may be associated with a temporal location preceding a temporal location associated with the current input frame. For example, the reference frame may be a recirculated frame from the temporal noise reduction unit 342. In some implementations, such as implementations including high dynamic range image processing, the reference frame may be a short exposure input frame corresponding to the long exposure current input frame.

In some implementations, the local motion estimation unit 320 may receive, or otherwise access, previously generated motion information, such as previously generated motion vectors for the current input frame or motion information for a previously processed frame.

The local motion estimation unit 320 may determine motion information, such as motion vectors, representing motion between the current input frame and the reference frame, such as motion caused by moving objects in the field-of-view or non-rotational motion, or translation, of the field-of-view. The local motion estimation unit 320 may output the motion information. For example, the local motion estimation unit 320 may output motion vectors to the local motion compensation unit 322.

The local motion compensation unit 322 may receive, or otherwise access, the reference frame, or one or more portions thereof, such as via the image signal processing bus 390. For example, in some implementations, such as implementations implementing high dynamic range image processing, the reference frame may be the short exposure input frame. In another example, in some implementations implementing high dynamic range image processing, the reference frame may be the long exposure input frame.

The local motion compensation unit 322 may receive, or otherwise access, motion information, such as motion vectors, associated with the current input frame. For example, the local motion compensation unit 322 may receive the motion vectors from the local motion estimation unit 320.

The local motion compensation unit 322 may apply the motion vectors to the reference frame, or one or more portions thereof, which may align or partially align the reference frame, or one or more portions thereof, with the current input frame, or one or more portions thereof. The local motion compensation unit 322 may output a local motion compensated reference frame, or one or more portions thereof.

The global motion compensation unit 324 may receive, or otherwise access, the reference frame, or one or more portions thereof, such as via the image signal processing bus 390. For example, in some implementations, such as implementations implementing high dynamic range image processing, the reference frame may be the short exposure input frame. In another example, in some implementations implementing high dynamic range image processing, the reference frame may be the long exposure input frame.

The global motion compensation unit 324 may receive, or otherwise access, global motion information, such as global motion information from a gyroscopic unit of the image capture apparatus, such as a gyroscopic sensor included in the metadata unit 132 shown in FIG. 1, corresponding to the current input frame. The global motion information may indicate a rotational change in the orientation of the field-of-view relative to the content captured in respective images. For example, the global motion information may indicate a horizontal change of the field-of-view, which may indicate that the corresponding camera panned or rotated around a vertical axis. In another example, the global motion information may indicate a vertical change of the field-of-view, which may indicate that the camera is tilted or rotated around an axis perpendicular to the lens. In another example, the global motion information may indicate a rotational change of the field-of-view relative to the horizon, which may indicate that the camera rolled or rotated around an axis parallel to the lens. The global motion information may be distinct from motion information, such as translation motion information, indicating a change in the geospatial location of the image capture apparatus, which may include a change associated with changing an elevation of the image capture apparatus. In some embodiments, other changes affecting the frame, such as zooming, may be included as global motion.

The global motion compensation unit 324 may apply the global motion information to the reference frame, or one or more portions thereof, which may align or partially align the reference frame, or one or more portions thereof, with the current input frame, or one or more portions thereof. The global motion compensation unit 324 may output a global motion compensated reference frame, or one or more portions thereof.

The high dynamic range (HDR) unit 330 may receive, or otherwise access, the current input frame, or one or more portions thereof, such as from the front ISP 310. The current input frame may be a long exposure input frame corresponding to the short exposure reference frame. The high dynamic range unit 330 may receive, or otherwise access, the local motion compensated reference frame from the local motion compensation unit 322. The high dynamic range unit 330 may receive, or otherwise access, the global motion compensated reference frame from the global motion compensation unit 324.

The high dynamic range (HDR) unit 330 may generate a high dynamic range image based on the current input image and the local motion compensated reference frame, the global motion compensated reference frame, or a combination thereof. For example, for each portion of the reference frame, such as each block, each pixel, or each Bayer, the HDR unit 330 may identify a value for the portion based on the corresponding portion of the local motion compensated reference frame or the corresponding portion of the global motion compensated reference frame.

The high dynamic range (HDR) unit 330 may output the high dynamic range image. For example, the HDR unit 330 may output the high dynamic range image by storing the high dynamic range image in memory, such as shared memory, via the image signal processing bus 390, or the HDR unit 330 may output the high dynamic range image directly to another unit of the ISP 300, such as the temporal noise reduction unit 342. In some implementations, the HDR unit 330 may be omitted, or high dynamic range processing by the HDR unit 330 may be omitted.

The three-dimensional noise reduction unit 340 may include the temporal noise reduction (TNR) unit 342, the raw to raw (R2R) unit 344, or both.

The temporal noise reduction unit 342 may receive the current input frame, or one or more portions thereof, such as from the front ISP 310 or via the image signal processing bus 390. In some implementations, such as implementations implementing high dynamic range image processing, the temporal noise reduction unit 342 may receive the high dynamic range input frame, or one or more portions thereof, such as from the high dynamic range unit 330, as the current input frame.

The temporal noise reduction unit 342 may receive, or otherwise access, the local motion compensated reference frame from the local motion compensation unit 322. The temporal noise reduction unit 342 may receive, or otherwise access, the global motion compensated reference frame from the global motion compensation unit 324.

The temporal noise reduction unit 342 may reduce temporal noise in the current input frame, which may include recursively reducing temporal noise in a sequence of input images, such as a video. Recursive temporal noise reduction may include combining a current image with noise feedback information corresponding to a previously processed frame, such as the reference frame, which may be a recirculated frame. For example, the reference frame may be the local motion compensated frame output by the local motion compensation unit 322, the global motion compensated frame output by the global motion compensation unit 324, or a combination thereof. For example, for each portion of the reference frame, such as each block, each pixel, or each Bayer, the temporal noise reduction unit 342 may identify a value for the portion based on the corresponding portion of the local motion compensated reference frame or the corresponding portion of the global motion compensated reference frame.

The temporal noise reduction unit 342 may generate output, including a pixel value and associated noise variance for the pixel value for one or more pixels of the current input frame.

The raw to raw unit 344 may perform spatial denoising of frames of raw images based on noise variance values received from the temporal noise reduction unit 342. For example, spatial denoising in the raw to raw unit 344 may include multiple passes of image signal processing, including passes at various resolutions.

The raw to YUV unit 350 may demosaic and/or color process the frames of raw images, which may include representing each pixel in the YUV format, which may include a combination of a luminance (Y) component and two chrominance (UV) components.

The YUV to YUV unit 360 may perform local tone mapping of YUV images. In some implementations, the YUV to YUV unit 360 may include multi-scale local tone mapping using a single pass approach or a multi-pass approach on a frame at different scales.

The warp and blend unit 370 may warp images, blend images, or both. In some implementations, the warp and blend unit 370 may warp a corona around the equator of each frame to a rectangle. For example, the warp and blend unit 370 may warp a corona around the equator of each frame to a rectangle based on the corresponding low-resolution frame generated by the front ISP 310.

The warp and blend unit 370 may apply one or more transformations to the frames. In some implementations, spherical images produced by a multi-face camera device may be warped and/or blended by the warp and blend unit 370 to correct for distortions at image edges. In some implementations, the warp and blend unit 370 may apply a transformation that is subject to a close to identity constraint, wherein a location of a pixel in an input image to the warp and blend unit 370 may be similar to (such as within a defined distance threshold of) a location of a corresponding pixel in an output image from the warp and blend unit 370. For example, the warp and blend unit 370 may include an internal memory, which may have a size, such as 100 lines, which may be smaller than a size of a frame, and the warp and blend unit 370 may process the input image data in raster-in/raster-out order using a transformation that is subject to a close to identity constraint.

In some implementations, the warp and blend unit 370 may apply a transformation that is independent of close to identity constraints, which may include processing the input image data in raster-in/dynamic-out or dynamic-in/raster-out order. For example, the warp and blend unit 370 may transform two or more non-rectilinear (fisheye) images to generate a combined frame, such as an equirectangular frame, by processing the input image data in raster-in/dynamic-out or dynamic-in/raster-out order.

The stitching cost unit 380 may generate a stitching cost map as an output. In some implementations, the cost map may be represented as a rectangle having disparity x and longitude y based on a warping. Each value of the cost map may be a cost function of a disparity x value for a corresponding longitude. Cost maps may be generated for various scales, longitudes, and disparities.

The scaler 385 may scale images received from the output of the warp and blend unit 370, which may be in patches, or blocks, of pixels, such as 16×16 blocks, 8×8 blocks, or patches or blocks of any other size or combination of sizes.

The image signal processing bus 390 may be a bus or interconnect, such as an on-chip interconnect or embedded microcontroller bus interface, for communication between the front ISP 310, the temporal noise reduction unit 342, the local motion compensation unit 322, the raw to raw unit 344, the raw to YUV unit 350, the YUV to YUV unit 360, the combined warp and blend unit 370, the stitching cost unit 380, the scaler 385, the configuration controller 395, or any combination thereof.

The configuration controller 395 may coordinate image processing by the front ISP 310, the local motion estimation unit 320, the local motion compensation unit 322, the global motion compensation unit 324, the high dynamic range unit 330, the three-dimensional noise reduction unit 340, the temporal noise reduction unit 342, the raw to raw unit 344, the raw to YUV unit 350, the YUV to YUV unit 360, the warp and blend unit 370, the stitching cost unit 380, the scaler 385, the image signal processing bus 390, or any combination thereof, of the ISP 300. For example, the configuration controller 395 may control camera alignment model calibration, auto-exposure, auto-white balance, or any other camera calibration or similar process or combination of processes. In some implementations, the configuration controller 395 may be a microcontroller. The configuration controller 395 is shown in FIG. 3 using broken lines to indicate that the configuration controller 395 may be included in the ISP 300 or may be external to, and in communication with, the ISP 300. The configuration controller 395 may include a respective clock, power domain, or both.

An approach to multiscale image denoising may be to decompose the input image with some type of multiscale decomposition, denoise each scale, and reconstruct the result from the estimates of the coarsest to the finest scales. Examples of some types of multiscale decomposition include Gaussian and Laplacian pyramids.

Figure 4:
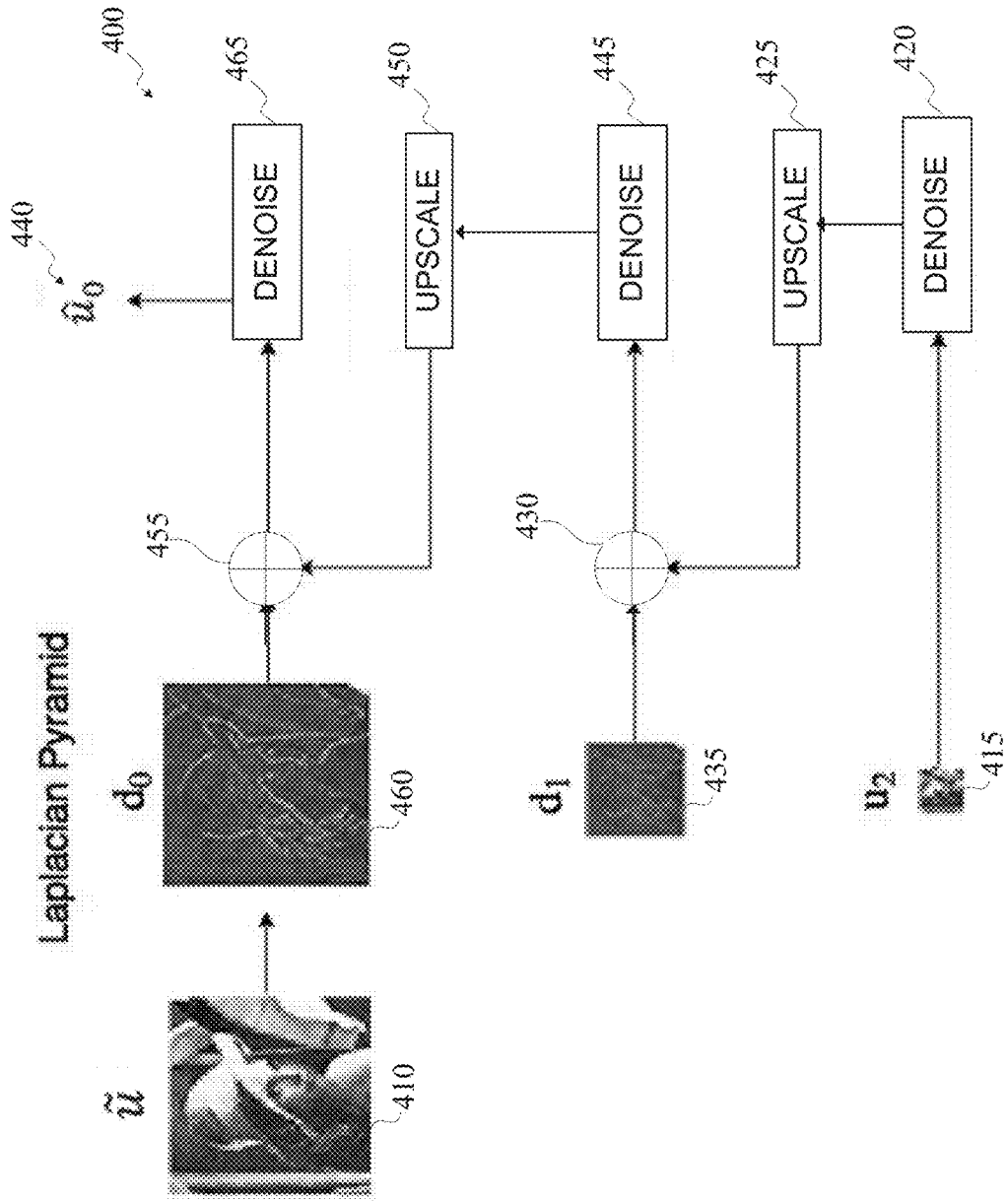
FIG. 4 is a diagram of an example of a bottom-up multiscale image denoising method.

FIG. 4 is a diagram of an example of a bottom-up multiscale image denoising method 400. In this example, a Laplacian pyramid is constructed of the input frame 410, also denoted as R. The sub-image in the coarsest scale, image 415, also denoted as u2, is denoised at operation 420. The result of the denoising at operation 420 is upscaled at operation 425 and combined at operation 430 with the details 435 of the adjacent scale, also denoted as d1. The procedure continues for each scale until the estimate of the finest scale 440, also denoted as $\hat{u}_0$, is constructed. The number of scales may vary and is not limited to the number shown in FIG. 4. In this example, the result of the combination at operation 430 is denoised at operation 445 and upscaled at operation 450. The result of the upscaling at operation 450 is combined at operation 455 with the details 460 of the adjacent scale, also denoted as d0. The result of the combination at operation 455 is denoised at operation 465, which results in the estimate of the finest scale 440.

Figure 5:
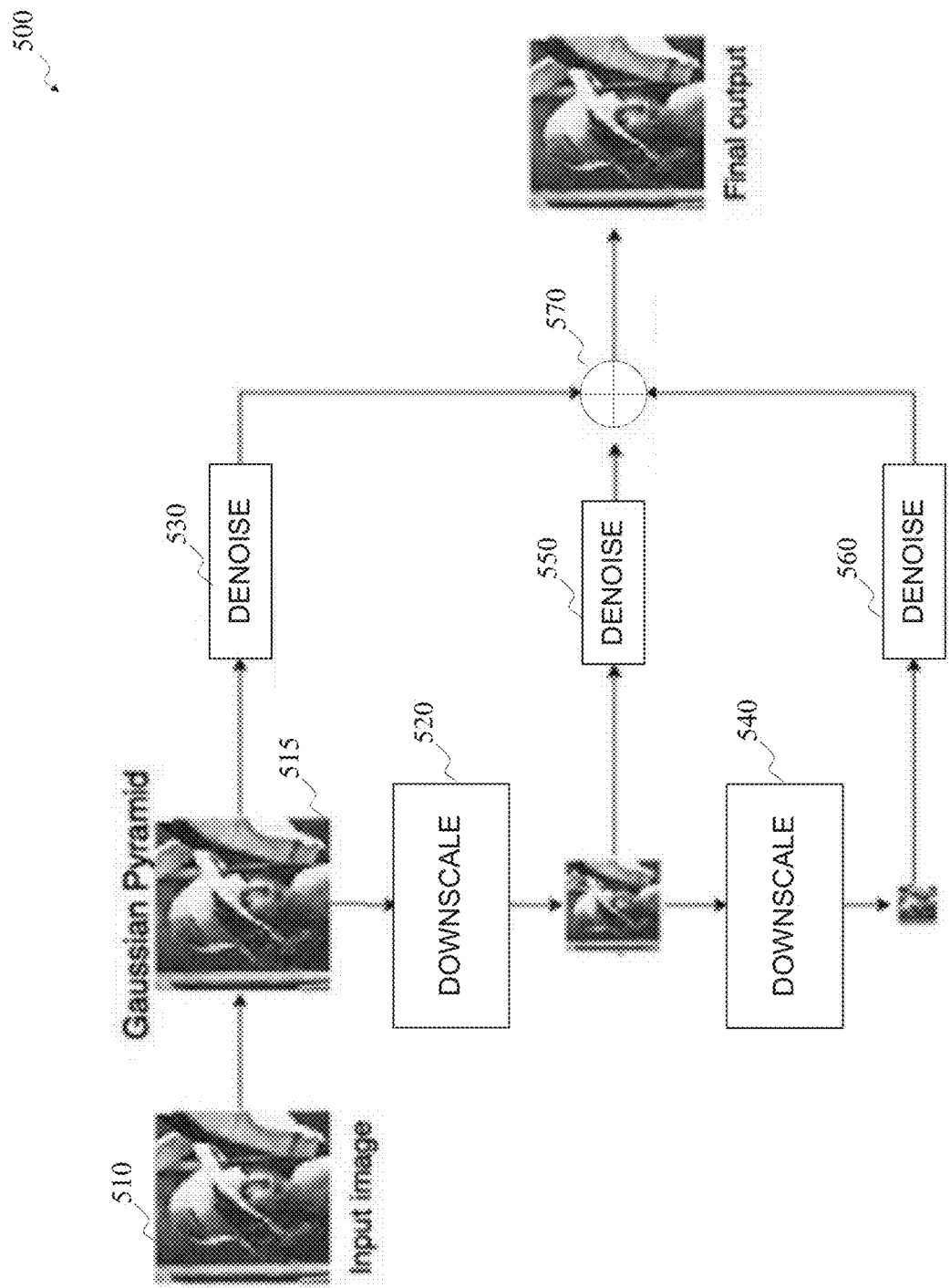
FIG. 5 is a diagram of an example of a parallel multiscale image denoising method.

FIG. 5 is a diagram of an example of a parallel multiscale image denoising method 500. In this example, an input image 510 is decomposed in a Gaussian pyramid where all the sub-images are denoised separately. The input image 510 is preprocessed at operation 515, for example, to adjust color balance, white balance, or both. As shown in FIG. 5, the preprocessed image 515 is downscaled at operation 520 and denoised at operation 530. The result of the downscaling at operation 520 is downscaled at operation 540 and denoised at operation 550. The result of the downscaling at operation 540 is denoised at operation 560. The number of scales may vary and is not limited to the number shown in FIG. 5. The result of the denoising at operation 530, the result of the denoising at operation 550, and the result of the denoising at operation 560 are reconstructed at operation 570, which results in the final estimate $\hat{u}_0$. The final estimate $\hat{u}_0$ is reconstructed according to Equation (1) below.

$$\hat{u}_k = \overline{u}_k - \mathcal{U}(\mathcal{D}(\overline{u}_k)) + \mathcal{U}(\overline{u}_{k+1}), \text{ for } k=K-2 \text{ to } 0 \qquad \text{Equation (1)}$$

Equation (1) is initialized with $\hat{u}_{k-1} = \overline{u}_{k-1}$, where $\overline{u}_k$ is the denoised version of the sub-image $u_k$, and where $\mathcal{D}$ and $\mathcal{U}$ are the downscaling and upscaling operators, respectively.

The pyramidal frameworks disclosed herein may depend on the downscaling operator $\mathcal{D}$ and the upscaling operator $\mathcal{U}$. The downscaling operator $\mathcal{D}$ may apply a low-pass filtering prior to decimation:

$$\mathcal{D}(v) = (\downarrow 2)(h * v) \qquad \text{Equation (2)}$$

where h is a linear low-pass filter, and downsampling ($\downarrow 2$) is defined as:

$$(\downarrow 2)(v)[i] = v[2i] \qquad \text{Equation (3)}$$

The upscaling operator $\mathcal{U}$ may be defined as:

$$\mathcal{U}(v) = 4 \cdot h * [(\uparrow 2)v] \qquad \text{Equation (4)}$$

where upsampling (↑2) is:

$$(\uparrow 2)(v)[i] = \begin{cases} v[i/2] & \text{if } i \text{ is even} \\ 0 & \text{if } i \text{ is odd} \end{cases} \quad \text{Equation (5)}$$

The upscaling operator inserts a zero in between adjacent pixels, upon which the result may be multiplied by 4 to preserve the mean image intensity. Examples of separable low-pass filters h are shown in Table 1.

TABLE 1

| Size | h |
|---|---|
| 2 × 2 | $[1/2, 1/2]^T \cdot [1/2, 1/2]$ |
| 3 × 3 | $[1/4, 1/2, 1/4]^T \cdot [1/4, 1/2, 1/4]$ |
| 5 × 5 | $[1/16, 4/16, 6/16, 4/16, 1/16]^T \cdot [1/16, 4/16, 6/16, 4/16, 1/16]$ |

For example, performing an upscaling operation with the 2×2 kernel results in pixel duplications, while using the 3×3 filter results in a bilinear interpolation.

Since the multiscale frameworks disclosed herein involve denoising operations in each of the scales of the pyramids, it would be helpful to know the noise that is present at each scale of the pyramids. In an example where a Gaussian pyramid $\mathcal{G} = \{u_0, \ldots, u_{K-1}\}$, the sub-image corresponding to a layer $u_k$ may be the downsampled version of the sub-image in the previous layer $u_k = \mathcal{D}(u_{k-1})$. In this example, the downscaling operator may apply a low-pass filter in accordance with Equation (2), and the noise variance $\mathbb{V}(n) = \mathbb{E}((n - \mathbb{E}(n))^2) = \sigma^{-2}$ may be known a priori, where $\mathbb{E}$ is an expected value. As the downscaling operator convolves the image with a linear filter, a first approach to determine the intensity of the noise in an adjacent scale may be to compute:

$$\mathbb{V}_{(h*n)} = \|h\|^2 \sigma^2 \quad \text{Equation (6)}$$

Equation (6) may hold on a condition that k sub-images of the pyramid are expressed as a result of a convolution of a linear filter with the image in the first scale of the pyramid, as the noise in the finest scale remains independent. Accordingly, it would be possible to express:

$$\mathcal{G}_k[i,j] = ((\downarrow 2)^k (W_{\mathcal{G}_k} * \mathcal{G}_0))[i,j] \quad \text{Equation (7)}$$

where $\mathcal{G}_k[i,j]$ may be the value of the sub-image of scale k of a Gaussian pyramid in a spatial position defined by i, j, and $W_{\mathcal{G}_k}$ is a separable weighting matrix $W_{\mathcal{G}_k} = w_{\mathcal{G}_k} w_{\mathcal{G}_k}^T$. A filter $w_{\mathcal{G}_k}$ may be expressed as:

$$w_{\mathcal{G}_k}[i] = \begin{cases} \delta[i], & k = 0 \\ \left(\bigwedge_{k=0}^{K-1} (\uparrow 2)^k h\right)[i], & k \geq 1 \end{cases} \quad \text{Equation (8)}$$

where the unit impulse $\delta[i]$ and the operator $\Lambda$ may be defined as:

$$\bigwedge_{k=0}^{K-1} f_k = f_1 * f_2 \ldots * f_K \quad \text{Equation (9)}$$

In this example, the variance of the noise in the scale k may be expressed as Equation (6) but, in terms of the noise in the first scale $\sigma_{\mathcal{G}_0}^2 = \sigma^2$, may be expressed as:

$$\sigma_{\mathcal{G}_k}^2 = \|w_{\mathcal{G}_k} w_{\mathcal{G}_k}^T\|^2 \sigma_{\mathcal{G}_0}^2 \quad \text{Equation (10)}$$

In an example, a 1000×1000 flat image was contaminated with white Gaussian noise of σ=30. A Gaussian pyramid decomposition of four scales was performed using a 5×5 filter of Table 1. In this example, the noise in the lower scales was underestimated when using Equation (6), whereas the values rendered by Equation (10) were more precise. Table 2 below presents a comparative example between the values of noise estimated by the methods in Equation (6) and Equation (10).

TABLE 2

| Scale | Measured σ | Expected σ, Equation (6) | Expected σ, Equation (10) |
|---|---|---|---|
| 0 | 30.013 | 30.000 | 30.000 |
| 1 | 8.210 | 8.204 | 8.203 |
| 2 | 3.721 | 2.244 | 3.704 |
| 3 | 1.826 | 0.613 | 1.749 |

Table 3 below also shows similar results but for a Gaussian decomposition using the 2×2 filter of Table 1.

TABLE 3

| Scale | Measured σ | Expected σ, Equation (6) |
|---|---|---|
| 0 | 30.026 | 30.000 |
| 1 | 14.985 | 15.000 |
| 2 | 7.458 | 7.500 |
| 3 | 3.739 | 3.750 |

Since the downscaling operator performs a 2×2 downsampling, noise in adjacent pixels in lower scales remains independent. Accordingly, the estimation provided by Equation (6) is precise when using the 2×2 filter of Table 1, as shown in Table 3 above.

For Laplacian pyramids, any layer may be expressed as a function of the first layer $$\mathcal{L}_k[i,j] = (\downarrow 2)^k (W_{\mathcal{L}_k} * \mathcal{G}_0)[i,j], \quad \text{equation (11)}$$

with non-separable weighting matrices $$W_{\mathcal{L}_k}[i,j] = (W_{\mathcal{G}_k} - ((\uparrow 2)^{k+1} h_{i,j} * W_{\mathcal{G}_{k+1}}))[i,j], \quad \text{Equation (12)}$$

and separable two-dimensional (2D) filter kernels $$h_{i,j} = ((\uparrow 2) h_{downs,i}) \cdot ((\uparrow 2) h_{downs,j})^T. \quad \text{Equation (13)}$$

The one-dimensional (1D) filter $h_{downs,j}$ may include even or odd coefficients of the interpolation filter $h_{1D}$ used to construct the pyramid, depending on whether j is even or odd.

Figure 6A:
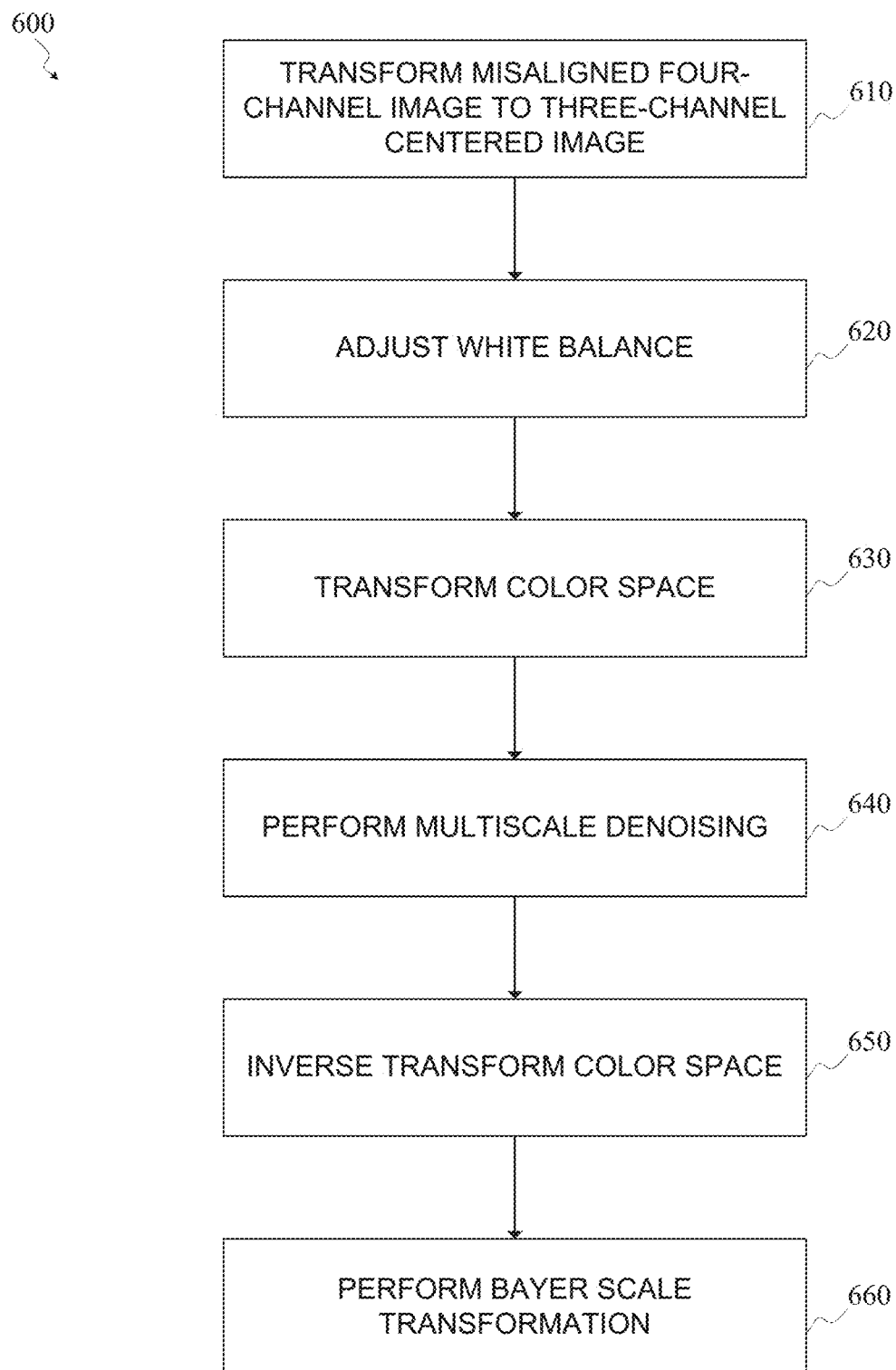
FIG. 6A is a diagram of an example of a multiscale image denoising pipe in accordance with implementations of this disclosure.

FIG. 6A is a diagram of an example of a multiscale image denoising pipe 600 in accordance with implementations of this disclosure. In this example, the multiscale image denoising pipe 600 receives a four-channel Bayer scale image ($G_r^{bayer}$, $R^{bayer}$, $B^{bayer}$, $G_b^{bayer}$) as an input. The four-channel Bayer scale image is a noisy image that is misaligned. In this example, the noise at neighboring pixels in the four-channel Bayer scale image is independent, meaning that the pixels are not correlated in terms of neighboring pixel noise.

Referring to FIG. 6A, the misaligned four-channel Bayer scale image is transformed into an (R, G, B) centered image at operation 610. The transformation may be performed in accordance with Equation (14) below.

$$\begin{cases} R(i,j) = & (9 \cdot R^{bayer}(i,j) + 3 \cdot R^{bayer}(i,j-1) + \\ & 3 \cdot R^{bayer}(i+1,j) + R^{bayer}(i+1,j-1))/16 \\ G(i,j) = & \left(G_r^{bayer}(i,j) + G_b^{bayer}(i,j)\right)/2 \\ B(i,j) = & (9 \cdot B^{bayer}(i,j) + 3 \cdot B^{bayer}(i,j+1) + \\ & 3 \cdot B^{bayer}(i-1,j) + B^{bayer}(i-1,j+1))/16 \end{cases} \quad \text{Equation (14)}$$

The multiscale image denoising pipe 600 continues to operation 620 to adjust the white balance of the transformed (R, G, B) centered image. At operation 620, the colors in the transformed (R, G, B) centered image are globally adjusted by multiplying each channel separately for weights $\lambda_R$, $\lambda_G$, $\lambda_B$. The white balance may be adjusted in accordance with Equation (15) below.

$$\begin{pmatrix} R' \\ G' \\ B' \end{pmatrix} = \begin{pmatrix} \lambda_R & 0 & 0 \\ 0 & \lambda_G & 0 \\ 0 & 0 & \lambda_B \end{pmatrix} \cdot \begin{pmatrix} R \\ G \\ B \end{pmatrix} \quad \text{Equation (15)}$$

The multiscale image denoising pipe 600 continues to operation 630 to transform the color space. At operation 630, the working space may be changed from (R, G, B) to (Y, $C_b$, $C_r$) to allow for separate denoising of chroma and luma in a more efficient manner. The applied transformation may be performed in accordance with Equation (16) below.

$$\begin{pmatrix} Y \\ C_b \\ C_r \end{pmatrix} = \begin{pmatrix} 0.299 & 0.587 & 0.114 \\ -0.1687 & -0.3313 & 0.5 \\ 0.5 & -0.4187 & -0.0813 \end{pmatrix} \begin{pmatrix} R \\ G \\ B \end{pmatrix} + \begin{pmatrix} 0 \\ 0.5 \\ 0.5 \end{pmatrix} \quad \text{Equation (16)}$$

The multiscale image denoising pipe 600 continues to operation 640 to perform multiscale denoising. The multiscale denoising method may be based on the bottom-up example method shown in FIG. 4, in which the input image is first decomposed in a Laplacian pyramid and all the sub-images of the pyramid are iteratively denoised starting from the coarsest scale to the finest scale. At operation 650, the multiscaled denoised image is inverse transformed to transform the image from (Y, $C_b$, $C_r$) to (R, G, B). At operation 660, the (R, G, B) image is transformed to a four-channel ($G_r^{bayer}$, $R^{bayer}$, $B^{bayer}$, $G_b^{bayer}$) image.

In accordance with implementations of this disclosure, the variance of the noise at the input of the denoising operation in scale k may be expressed in terms of the variance of the noise of an image with uncorrelated pixels, for example, an image $I^{bayer}$ at Bayer scale. For example, for an input image $I_k$ of the denoising operation k, for a pixel $I_k[i,j,c]$ at position i,j in the color channel c, the methods and systems trace back which pixels in the Bayer scale image $I^{bayer}$ contribute to the value of the pixel $I_k[i,j,c]$. In other words, the methods and systems are configured to backtrace the coefficients $w_{i,j,c}[k,l,m]$ of a weight matrix $W_{i,j,c}$ such that $I_k[i,j,c] = w_{i,j,c} \cdot I^{bayer}$. It may then be possible to determine the variance of the noise $\sigma_k^2[i,j,c]$ at pixel $I_k[i,j,c]$ as a linear combination of the noise variance $\sigma_{bayer}^2[k,l,m]$ of the pixels $I^{bayer}[k,l,m]$ at Bayer scale and coefficients $w_{i,j,c}[k,l,m]$, for example, $\sigma_k^2[i,j,c] = \Sigma_{k,l,m} w_{i,j,c}^2[k,l,m] \sigma_{bayer}^2[k,l,m]$. In some implementations, this determination may only be performed on the image $I^{bayer}$ at Bayer scale when it is the only image in the pipe with uncorrelated pixels.

Figure 6B:
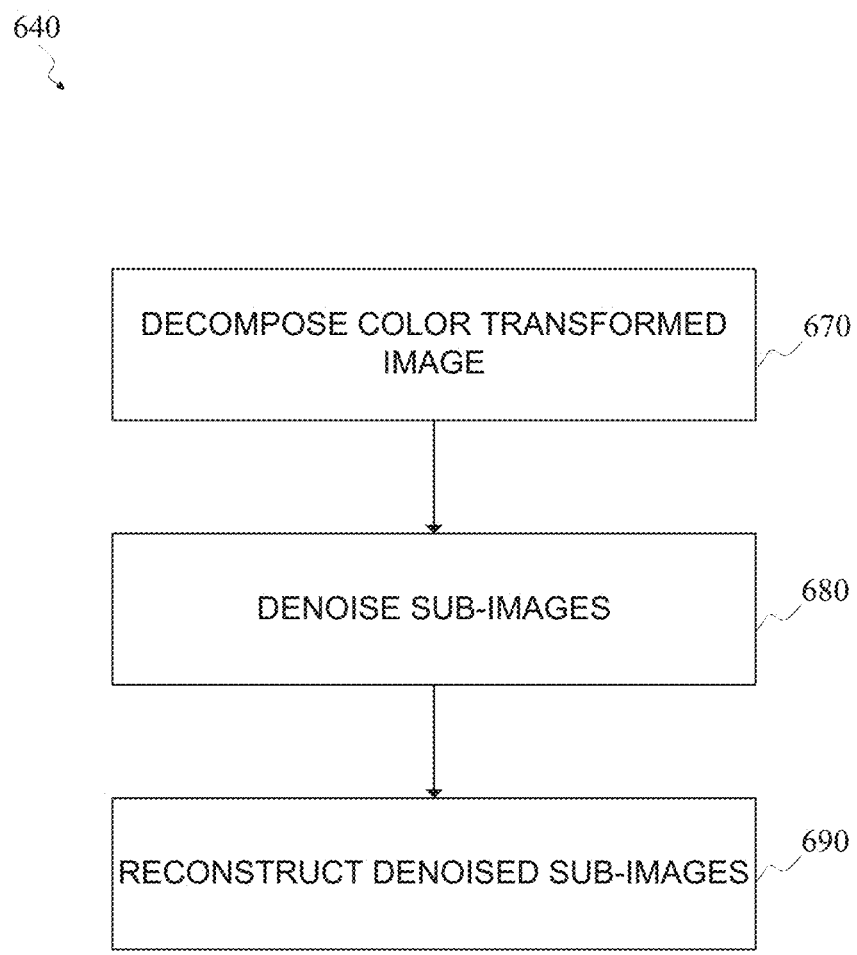
FIG. 6B is a diagram of an example of multiscale denoising in accordance with implementations of this disclosure.

FIG. 6B is a diagram of an example of multiscale denoising shown in operation 640 of FIG. 6A. Referring to FIG. 6B, multiscale denoising includes decomposing the color transformed image into one or more sub-images at operation 670. The one or more sub-images may range from a coarse scale to a fine scale. The one or more sub-images are iteratively denoised at operation 680. In some implementations, the one or more sub-images may be iteratively denoised from the coarse scale to the fine scale. At operation 690, the one or more denoised sub-images are reconstructed to produce a denoised image.

Figure 7:
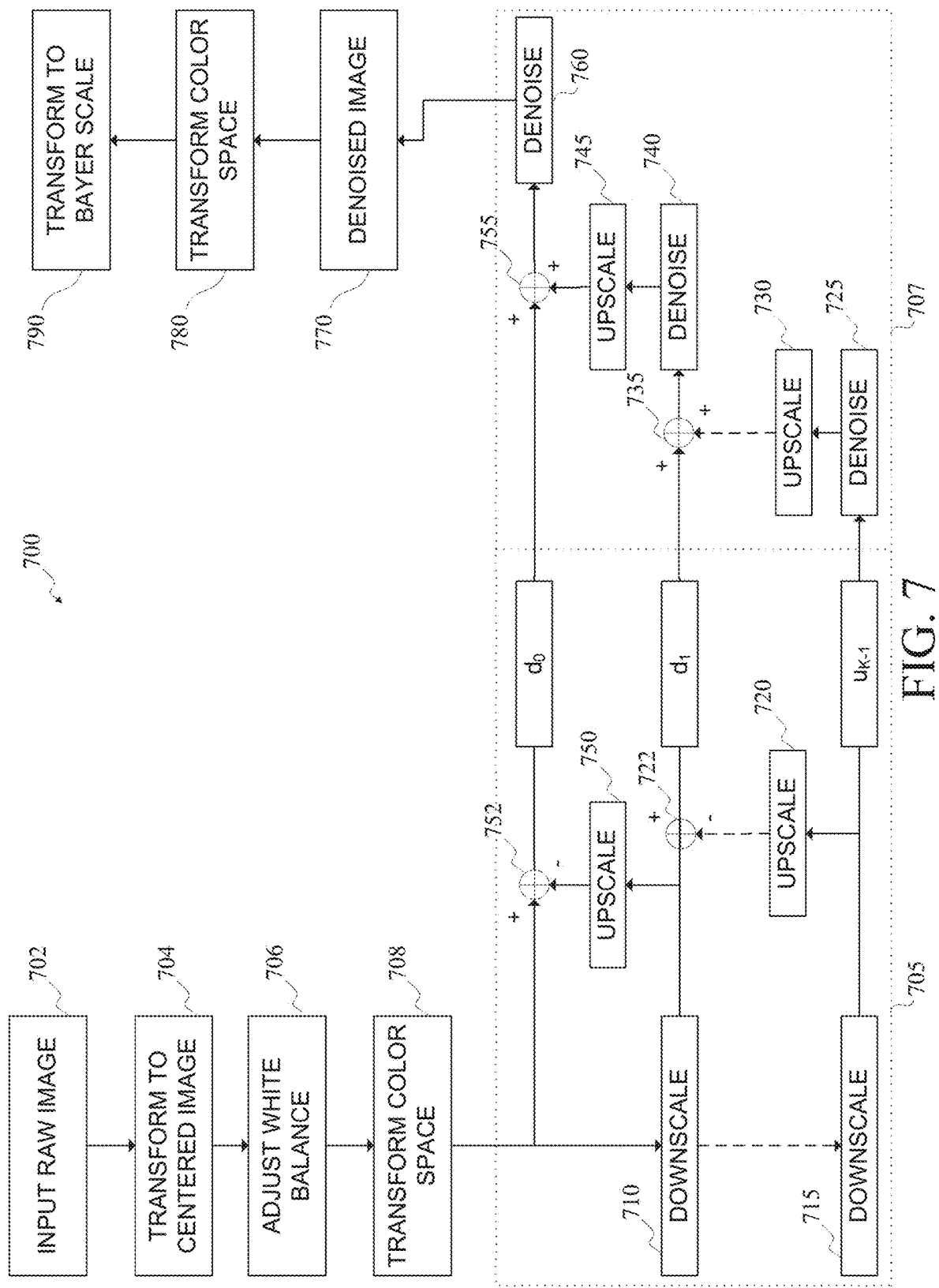
FIG. 7 is a diagram of an example of a RAW image processing pipe in accordance with implementations of this disclosure.

FIG. 7 is a diagram of an example of a RAW image processing pipe 700 in accordance with implementations of this disclosure. In this example, the RAW image processing pipe 700 receives a four-channel Bayer scale image ($G_r^{bayer}$, $R^{bayer}$, $B^{bayer}$, $G_b^{bayer}$) as an input image at operation 702. The four-channel Bayer scale image is a noisy image that is misaligned. In this example, the noise at neighboring pixels in the four-channel Bayer scale image is independent, meaning that the pixels are not correlated in terms of neighboring pixel noise.

Referring to FIG. 7, the misaligned four-channel Bayer scale image is transformed into an (R, G, B) centered image at operation 704. The transformation may be performed in accordance with Equation (14), as described above.

The RAW image processing pipe 700 continues to operation 706 to adjust the white balance of the transformed (R, G, B) centered image. At operation 706, the colors in the transformed (R, G, B) centered image are globally adjusted by multiplying each channel separately for weights $\lambda_R$, $\lambda_G$, $\lambda_B$. The white balance may be adjusted in accordance with Equation (15), as described above.

The RAW image processing pipe 700 continues to operation 708 to transform the color space. At operation 708, the working space may be changed from (R, G, B) to (Y, $C_b$, $C_r$) to allow for separate denoising of chroma and luma in a more efficient manner. The applied transformation may be performed in accordance with Equation (16), as described above.

The color space transformed image is then iteratively downscaled using a Laplacian pyramid 705, followed by a multiscale denoising procedure 707. In this example, the color space transformed image is downscaled at operation 710, and a resulting image of the downscaling at operation 710 is further downscaled at operation 715. Although only two downscaling operations are shown in FIG. 7 for simplicity, any number of downscaling operations may be implemented.

Referring to FIG. 7, the resulting image from the downscaling at operation 715 is upscaled at operation 720. The resulting image from the downscaling at operation 715 may be a low sub-scaled image that represents low-frequency noise, denoted as $u_{K-1}$ in FIG. 7. At operation 722, the resulting image from the upscaling at operation 720 is subtracted from the resulting image from the downscaling at operation 710 to determine the details $d_1$. In this example, the details $d_1$ may represent medium-frequency noise. At operation 725, the resulting image from the downscaling at operation 715 is denoised. The resulting image from the denoising at operation 725 is upscaled at operation 730 and combined at operation 735 with the details $d_1$. The resulting image of the combination at operation 735 is denoised at operation 740. The resulting image of the denoising at operation 740 is upscaled at operation 745.

At operation 750, the resulting image of the downscaling at operation 710 is upscaled. At operation 752, the resulting image of the upscaling at operation 750 is subtracted from the resulting image of the color space transformation at operation 708 to determine the details do. In this example, the details do may represent high-frequency noise. At operation 755, the details do are combined with the image resulting from the upscaling at operation 745. The resulting image of the combination at operation 755 is denoised at operation 760, resulting in a denoised image 770. At operation 780, the denoised image 770 is inverse transformed to transform the image from (Y, $C_b$, $C_r$) to (R, G, B). At operation 790, the (R, G, B) image is transformed to a four-channel ($G_r^{bayer}$, $R^{bayer}$, $B^{bayer}$, $G_b^{bayer}$) image.

Figure 8:
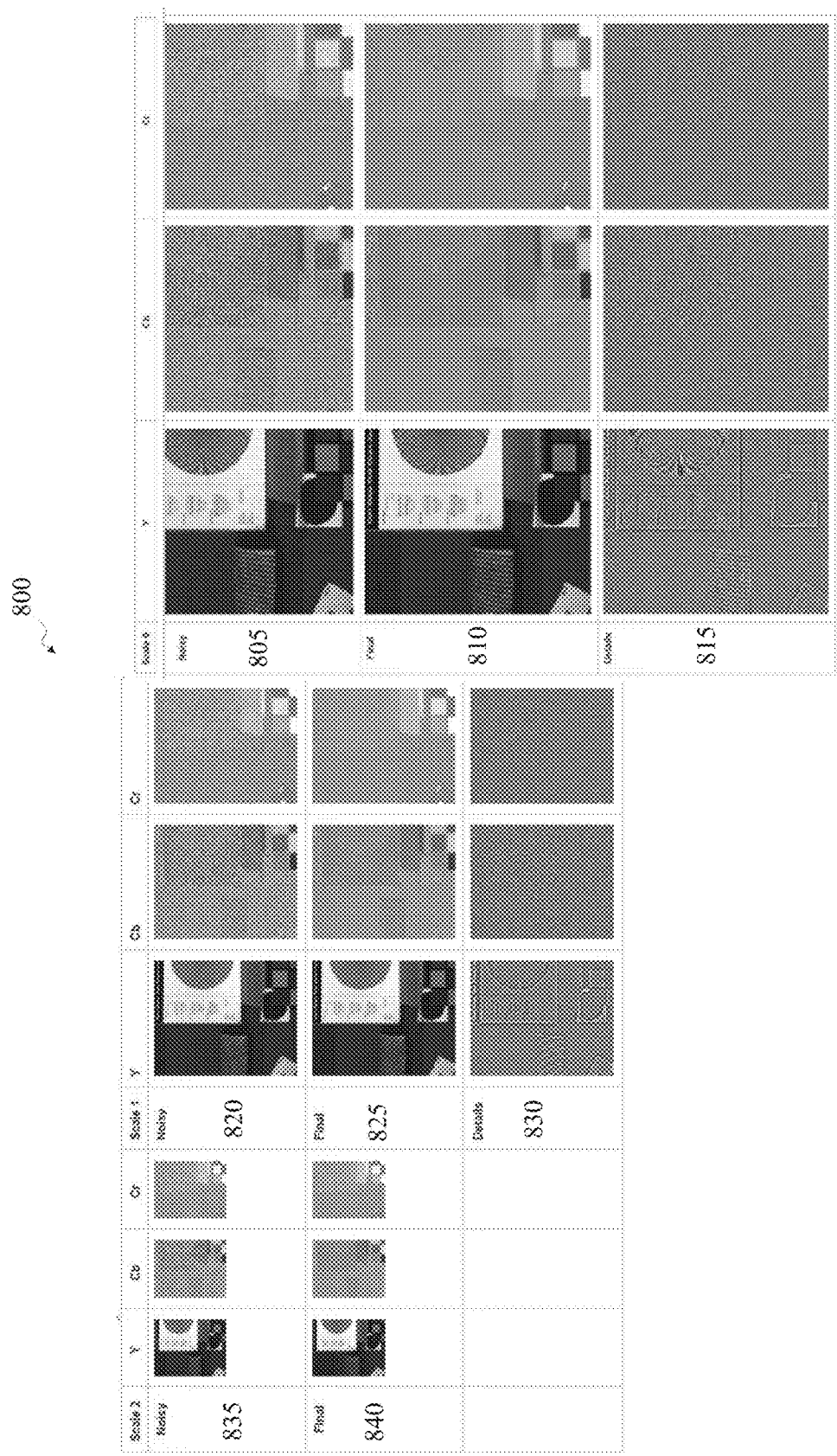
FIG. 8 shows examples of scaled color space transformed images in accordance with implementations of this disclosure.

FIG. 8 shows examples of scaled color space transformed images 800 in accordance with implementations of this disclosure. Referring to FIG. 8, a noisy raw image 805 is shown at a first scale (Scale 0) for each of channels Y, Cb, and Cr. The final image 810 at Scale 0 is an example of the resulting image of the upscaling at operation 750 in FIG. 7. Referring to FIG. 7, the resulting image of the upscaling at operation 750 is subtracted from the resulting image of the color space transformation at operation 708 to determine the details do. An example image of the details do at Scale 0 is shown as details 815 in FIG. 8. The details 815 in this example may represent high-frequency noise.

The noisy image 820 is an example of the downscaled image of operation 710 in FIG. 7. The noisy image 820 is shown at a second scale (Scale 1) for each of channels Y, Cb, and Cr. The final image 825 at Scale 1 is an example of the resulting image of the upscaling at operation 720 that is subtracted from the resulting image from the downscaling at operation 710 to determine the details $d_1$. An example image of the details $d_1$ at Scale 1 is shown as details 830 in FIG. 8. The details 830 in this example may represent medium-frequency noise.

The noisy image 835 is an example of the downscaled image of operation 715 in FIG. 7. The noisy image 835 is shown at a third scale (Scale 2) for each of channels Y, Cb, and Cr. The final image 840 at Scale 2 is an example of the resulting image from the downscaling at operation 715 in FIG. 7. The final image 840 at Scale 2 may be a low sub-scaled image that represents low-frequency noise, denoted as $u_{K-1}$ in FIG. 7.

Figure 9:
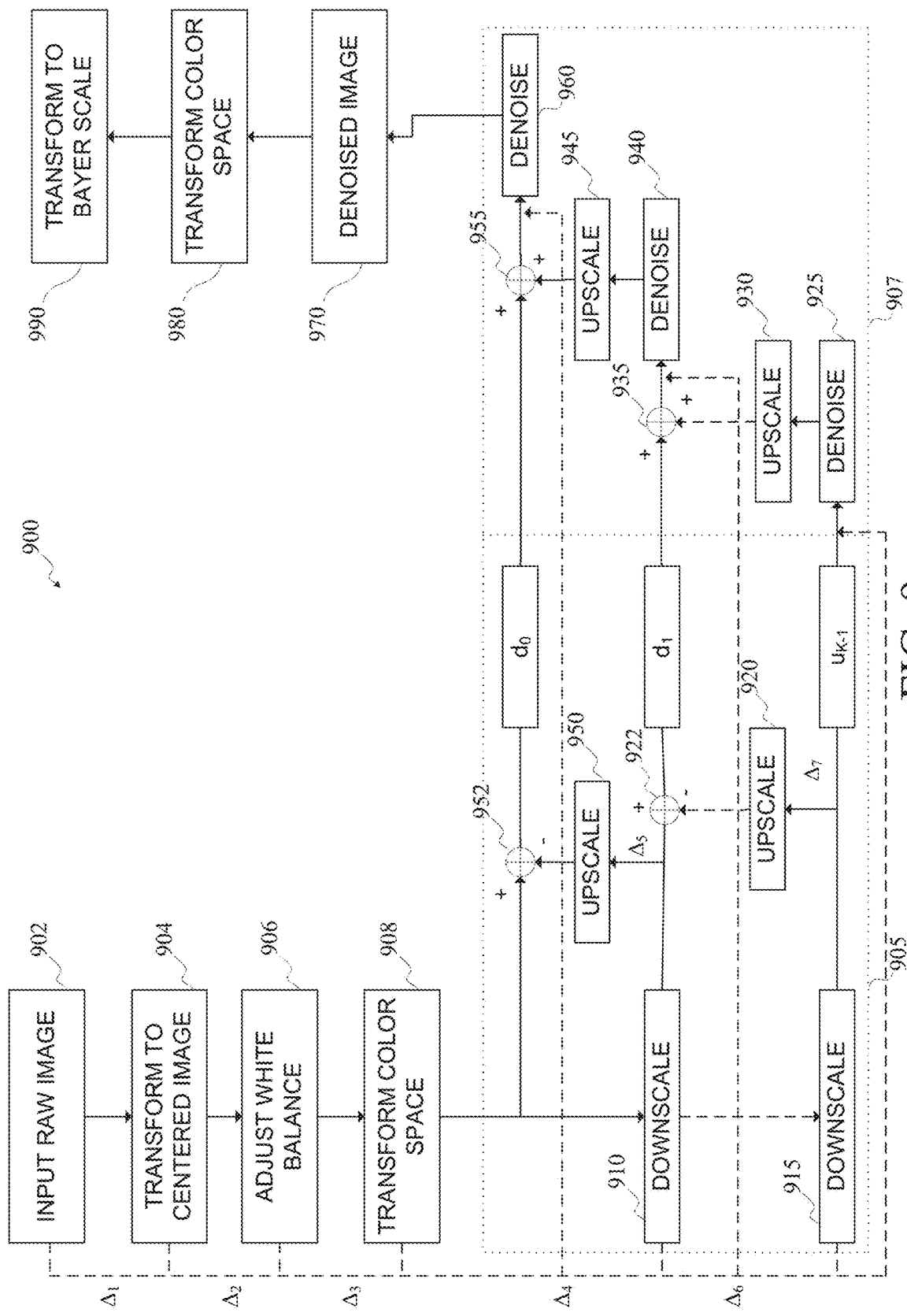
FIG. 9 is a diagram of an example of a RAW image processing pipe with noise estimation prior to denoising in accordance with implementations of this disclosure.

FIG. 9 is a diagram of another example of a RAW image processing pipe with noise estimation prior to denoising in accordance with implementations of this disclosure. In this example, the RAW image processing pipe 900 receives a four-channel Bayer scale image ($G_r^{bayer}$, $R^{bayer}$, $B^{bayer}$, $G_b^{bayer}$) as an input image at operation 902. The four-channel Bayer scale image is a noisy image that is misaligned. In this example, the noise at neighboring pixels in the four-channel Bayer scale image is independent, meaning that the pixels are not correlated in terms of neighboring pixel noise.

Referring to FIG. 9, the misaligned four-channel Bayer scale image is transformed into an (R, G, B) centered image at operation 904. The transformation may be performed in accordance with Equation (14), as described above.

The RAW image processing pipe 900 continues to operation 906 to adjust the white balance of the transformed (R, G, B) centered image. At operation 906, the colors in the transformed (R, G, B) centered image are globally adjusted by multiplying each channel separately for weights $\lambda_R$, $\lambda_G$, $\lambda_B$. The white balance may be adjusted in accordance with Equation (15), as described above.

The RAW image processing pipe 900 continues to operation 908 to transform the color space. At operation 908, the working space may be changed from (R, G, B) to (Y, $C_b$, $C_r$) to allow for separate denoising of chroma and luma in a more efficient manner. The applied transformation may be performed in accordance with Equation (16), as described above.

The color space transformed image is then iteratively downscaled using a Laplacian pyramid 905, followed by a multiscale denoising procedure 907. In this example, the color space transformed image is downscaled at operation 910, and a resulting image of the downscaling at operation 910 is further downscaled at operation 915. Although only two downscaling operations are shown in FIG. 9 for simplicity, any number of downscaling operations may be implemented. In this example, a noise estimation is performed at each operation to estimate the correlation of the noise of neighboring pixels. The input image at operation 902 may be a RAW image where the noise is independent of the pixels, such that the noise of neighboring pixels is not correlated. Upon transformation of the image at operation 904, a noise estimation is performed to estimate the correlation of the noise of neighboring pixels. In this example, $\Delta_1$ is the difference of the correlation of the noise of neighboring pixels from operation 902 to operation 904. Similarly, $\Delta_2$ is the difference of the correlation of the noise of neighboring pixels from operation 904 to operation 906, $\Delta_3$ is the difference of the correlation of the noise of neighboring pixels from operation 906 to operation 908, $\Delta_4$ is the difference of the correlation of the noise of neighboring pixels from operation 908 to operation 910, As is the difference of the correlation of the noise of neighboring pixels from operation 910 to operation 950, $\Delta_6$ is the difference of the correlation of the noise of neighboring pixels from operation 910 to operation 915, and $\Delta_7$ is the difference of the correlation of the noise of neighboring pixels from operation 915 to operation 920.

Referring to FIG. 9, the resulting image from the downscaling at operation 915 is upscaled at operation 920. The resulting image from the downscaling at operation 915 may be a low sub-scaled image that represents low-frequency noise, denoted as $u_{K-1}$ in FIG. 9. At operation 922, the resulting image from the upscaling at operation 920 is subtracted from the resulting image from the downscaling at operation 910 to determine the details $d_1$. In this example, the details $d_1$ may represent medium-frequency noise.

In this example, the resulting image from the downscaling operation at 915 is adjusted by combining a noise estimation from each of the previous processing operations. For example, the noise estimation may include $\Delta_1$, $\Delta_2$, $\Delta_3$, $\Delta_4$, $\Delta_5$, $\Delta_6$, and $\Delta_7$.

At operation 925, the resulting image from the downscaling at operation 915 and combined noise estimation is denoised. The resulting image from the denoising at operation 925 is upscaled at operation 930 and combined at operation 935 with the details $d_1$ and a noise estimation from each of the previous processing operations; for example, the noise estimation may include $\Delta_1$, $\Delta_2$, $\Delta_3$, $\Delta_4$, $\Delta_5$, $\Delta_6$ and $\Delta_7$. The resulting image of the combination at operation 935 is denoised at operation 940. The resulting image of the denoising at operation 940 is upscaled at operation 945.

At operation 950, the resulting image of the downscaling at operation 910 is upscaled. At operation 952, the resulting image of the upscaling at operation 950 is subtracted from the resulting image of the color space transformation at operation 908 to determine the details do. In this example, the details do may represent high-frequency noise. At operation 955, the details do are combined with the image resulting from the upscaling at operation 945 and a noise estimation from each of the previous processing operations; for example, the noise estimation may include $\Delta_1$, $\Delta_2$, $\Delta_3$, $\Delta_4$ and $\Delta_5$. The resulting image of the combination at operation 955 is denoised at operation 960, resulting in a denoised image 970. At operation 980, the denoised image 970 is inverse transformed to transform the image from (Y, $C_b$, $C_r$) to (R, G, B). At operation 990, the (R, G, B) image is transformed to a four-channel ($G_r^{bayer}$, $R^{bayer}$, $B^{bayer}$, $G_b^{bayer}$) image.

Figure 10:
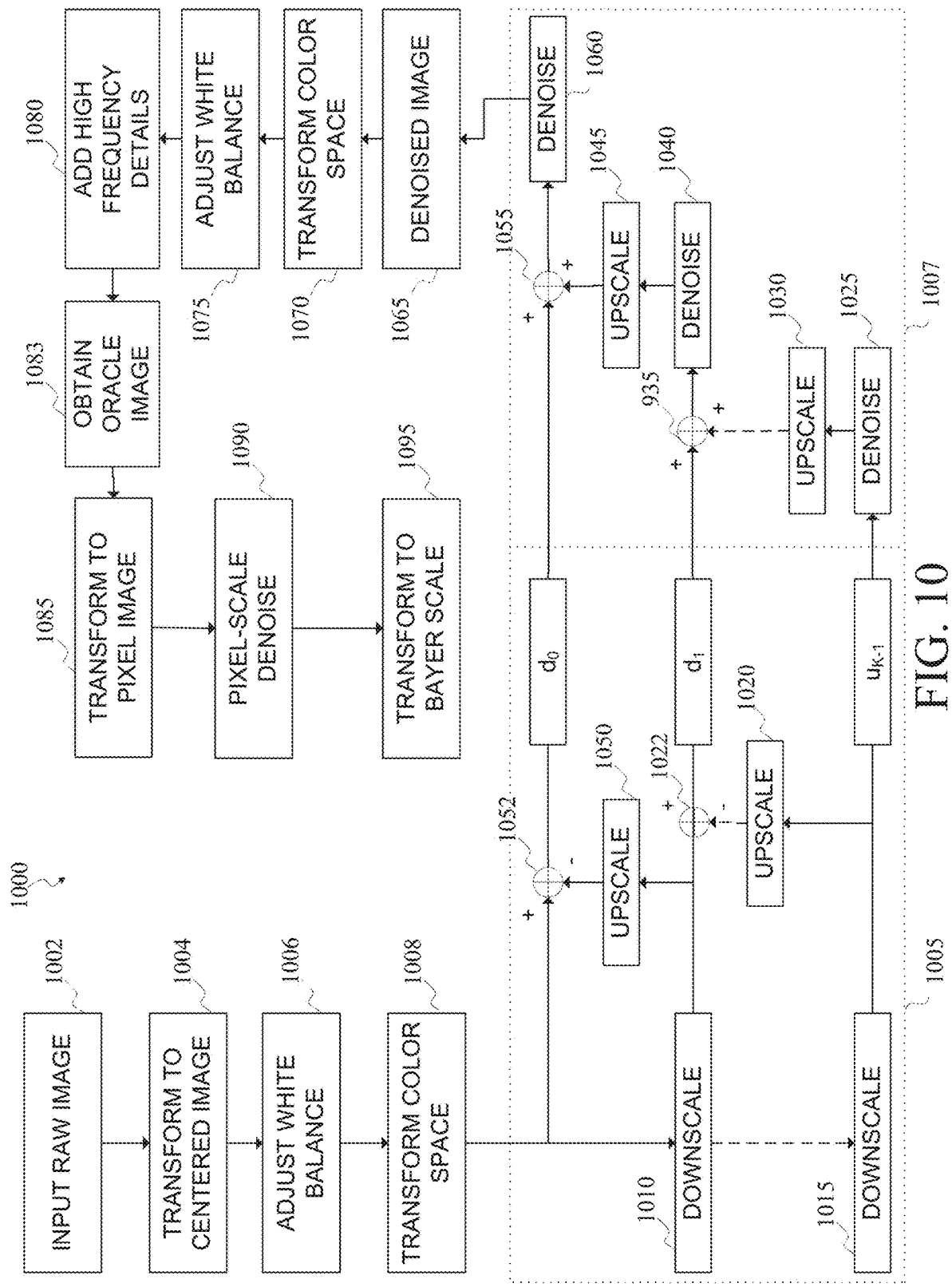
FIG. 10 is a diagram of another example of a RAW image processing pipe in accordance with implementations of this disclosure.

FIG. 10 is a diagram of another example of a RAW image processing pipe in accordance with implementations of this disclosure. In this example, the RAW image processing pipe 1000 receives a four-channel Bayer scale image ($G_r^{bayer}$, $R^{bayer}$, $B^{bayer}$, $G_b^{bayer}$) as an input image at operation 1002. The four-channel Bayer scale image is a noisy image that is misaligned. In this example, the noise at neighboring pixels in the four-channel Bayer scale image is independent, meaning that the pixels are not correlated in terms of neighboring pixel noise.

Referring to FIG. 10, the misaligned four-channel Bayer scale image is transformed into an (R, G, B) centered image at operation 1004. The transformation may be performed in accordance with Equation (14), as described above.

The RAW image processing pipe 1000 continues to operation 1006 to adjust the white balance of the transformed (R, G, B) centered image. At operation 1006, the colors in the transformed (R, G, B) centered image are globally adjusted by multiplying each channel separately for weights $\lambda_R$, $\lambda_G$, $\lambda_B$. The white balance may be adjusted in accordance with Equation (15), as described above.

The RAW image processing pipe 1000 continues to operation 1008 to transform the color space. At operation 1008, the working space may be changed from (R, G, B) to (Y, $C_b$, $C_r$) to allow for separate denoising of chroma and luma in a more efficient manner. The applied transformation may be performed in accordance with Equation (16), as described above.

The color space transformed image is then iteratively downscaled using a Laplacian pyramid 1005, followed by a multiscale denoising procedure 1007. In this example, the color space transformed image is downscaled at operation 1010, and a resulting image of the downscaling at operation 1010 is further downscaled at operation 1015. Although only two downscaling operations are shown in FIG. 10 for simplicity, any number of downscaling operations may be implemented.

Referring to FIG. 10, the resulting image from the downscaling at operation 1015 is upscaled at operation 1020. The resulting image from the downscaling at operation 1015 may be a low sub-scaled image that represents low-frequency noise, denoted as $u_{K-1}$ in FIG. 10. At operation 1022, the resulting image from the upscaling at operation 1020 is subtracted from the resulting image from the downscaling at operation 1010 to determine the details $d_1$. In this example, the details $d_1$ may represent medium-frequency noise. At operation 1025, the resulting image from the downscaling at operation 1015 is denoised. The resulting image from the denoising at operation 1025 is upscaled at operation 1030 and combined at operation 1035 with the details $d_1$. The resulting image of the combination at operation 1035 is denoised at operation 1040. The resulting image of the denoising at operation 1040 is upscaled at operation 1045.

At operation 1050, the resulting image of the downscaling at operation 1010 is upscaled. At operation 1052, the resulting image of the upscaling at operation 1050 is subtracted from the resulting image of the color space transformation at operation 1008 to determine the details do. In this example, the details do may represent high-frequency noise. At operation 1055, the details do are combined with the image resulting from the upscaling at operation 1045. The resulting image of the combination at operation 1055 is denoised at operation 1060, resulting in a denoised image 1065. At operation 1070, the denoised image 1065 is inverse transformed to transform the image from (Y, $C_b$, $C_r$) to (R, G, B). At operation 1075, the inverse transformed image from operation 1070 is adjusted to remove the white balance adjustment from operation 1006. At operation 1080, high-frequency details are added to the white balance adjusted image from operation 1075. At operation 1083, an oracle image is obtained. The oracle image may be obtained as follows: For each pixel (i,j) and each channel c, a local standard deviation $\sigma_e$ is computed around (i,j, c) over the image. $\sigma_e$ may then be compared to the local noise value $\sigma_n$. A blend may be performed between the low-frequency (LF) denoised image and the high-frequency (HF) noisy image in accordance with the ratio $r=\sigma_e/\sigma_n$.

The resulting oracle image from operation 1083 is transformed from a four-channel Bayer image to a one-channel pixel image at operation 1085. The resulting one-channel pixel image from operation 1085 is pixel-scale denoised at operation 1090. At operation 1095, the denoised one-channel pixel image from operation 1090 is transformed to a four-channel ($G_r^{bayer}$, $R^{bayer}$, $B^{bayer}$, $G_b^{bayer}$) image.

Where certain elements of these implementations may be partially or fully implemented using known components, only those portions of such known components that are necessary for an understanding of this disclosure have been described. Detailed descriptions of other portions of such known components have been omitted so as not to obscure the disclosure.

An implementation showing a singular component in this disclosure should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

As used herein, the terms "image capture device," "imaging device," and "camera" may be used to refer to any imaging device or sensor configured to capture, record, and/or convey still and/or video imagery that may be sensitive to visible parts of the electromagnetic spectrum, invisible parts of the electromagnetic spectrum (e.g., infrared, ultraviolet), and/or other energy (e.g., pressure waves).

While certain aspects of the implementations described herein are described in terms of a specific sequence of operations of a method, these descriptions are illustrative only of the broader methods of the disclosure and may be modified as required by the particular applications thereof. Certain operations may be rendered unnecessary or optional under certain circumstances. Additionally, certain operations or functionality may be added to the disclosed implementations, or the order of performance of two or more operations may be permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies disclosed.

What is claimed is:

1. An image capture device comprising:
an image processor configured to:
obtain a raw image, wherein the raw image includes noise artifacts;
transform the raw image from a misaligned four-channel image to a three-channel centered image, wherein the three-channel centered image has an RGB color space;
determine a first noise estimate based on the raw image and the three-channel centered image;
multiply each channel of the three-channel centered image by a respective weight to adjust a white balance of the three-channel centered image;
determine a second noise estimate based on the three-channel centered image and the white balance adjusted image;
transform the RGB color space to a YCbCr color space to produce a color transformed image;
determine a third noise estimate based on the white balance adjusted image and the color transformed image;
decompose the color transformed image into a plurality of sub-images ranging from a coarse scale to a fine scale;
determine a respective noise estimate for each of the plurality of sub-images, wherein each respective noise estimate is based on an image at a present scale and an image of an adjacent scale;
iteratively denoise each of the plurality of sub-images from the coarse scale to the fine scale;
reconstruct the plurality of denoised sub-images to produce a denoised image;
transform the YCbCr color space of the denoised image to the RGB color space to produce an inverse color space transformed image; and
transform the inverse color space transformed image to a Bayer scale image; and
a memory configured to store the Bayer scale image.

2. The image capture device of claim 1, wherein the image processor is further configured to combine the first noise estimate, the second noise estimate, and the third noise estimate with each respective noise estimate and each respective sub-image prior to denoising.

3. The image capture device of claim 1, wherein the image processor is further configured to upscale each of the plurality of sub-images.

4. The image capture device of claim 3, wherein the image processor is further configured to determine a plurality of respective details for each of the plurality of sub-images by subtracting a respective upscaled sub-image from the color transformed image.

5. The image capture device of claim 4, wherein the image processor is further configured to combine each respective plurality of details with a respective upscaled sub-image of an adjacent scale.

6. The image capture device of claim 5, wherein the adjacent scale is a coarser scale.

7. The image capture device of claim 5, wherein the image processor is configured to combine each respective plurality of details with the respective upscaled sub-image prior to denoising each of the plurality of sub-images.

8. A method comprising:
obtaining a raw image, wherein the raw image includes noise artifacts;
transforming the raw image from a misaligned four-channel image to a three-channel centered image, wherein the three-channel centered image has an RGB color space;
determining a first noise estimate based on the raw image and the three-channel centered image;
multiplying each channel of the three-channel centered image by a respective weight to adjust a white balance of the three-channel centered image;
determining a second noise estimate based on the three-channel centered image and the white balance adjusted image;
transforming the RGB color space to a YCbCr color space to produce a color transformed image;
determining a third noise estimate based on the white balance adjusted image and the color transformed image;
decomposing the color transformed image into a plurality of sub-images ranging from a coarse scale to a fine scale;
iteratively denoising each of the plurality of sub-images from the coarse scale to the fine scale;
reconstructing the plurality of denoised sub-images to produce a denoised image;
transforming the YCbCr color space of the denoised image to the RGB color space to produce an inverse color space transformed image;
transforming the inverse color space transformed image to a Bayer scale image; and
storing the Bayer scale image.

9. The method of claim 8, further comprising:
combining the first noise estimate, the second noise estimate, and the third noise estimate with each respective noise estimate and each respective sub-image prior to denoising; and
determining a respective noise estimate for each of the plurality of sub-images, wherein each respective noise estimate is based on an image at a present scale and an image of an adjacent scale.

10. The method of claim 8, further comprising:
upscaling each of the plurality of sub-images.

11. The method of claim 10, further comprising:
determining a plurality of respective details for each of the plurality of sub-images by subtracting a respective upscaled sub-image from the color transformed image.

12. The method of claim 11, further comprising:
combining each respective plurality of details with a respective upscaled sub-image of an adjacent scale.

13. The method of claim 12, wherein the adjacent scale is a coarser scale.

14. The method of claim 12, further comprising:
combining each respective plurality of details with the respective upscaled sub-image prior to denoising each of the plurality of sub-images.

15. An image capture device comprising:
an image processor configured to:
obtain a raw image, wherein the raw image includes noise artifacts;
transform the raw image from a misaligned four-channel image to a three-channel centered image, wherein the three-channel centered image has an RGB color space;
determine a first noise estimate based on the raw image and the three-channel centered image;
adjust a white balance of the three-channel centered image to obtain a white balance adjusted image;

determine a second noise estimate based on the three-channel centered image and the white balance adjusted image;

transform the RGB color space of the three-channel centered image to obtain a color transformed image;

determine a third noise estimate based on the white balance adjusted image and the color transformed image;

decompose the color transformed image into a plurality of sub-images ranging from a coarse scale to a fine scale;

iteratively denoise each of the plurality of sub-images from the coarse scale to the fine scale; and reconstruct the plurality of denoised sub-images to produce a denoised image.

16. The image capture device of claim 15, wherein the image processor is further configured to:

multiply each channel of the three-channel centered image by a respective weight to adjust the white balance of the three-channel centered image.

17. The image capture device of claim 15, wherein the image processor is further configured to:

transform the RGB color space to a YCbCr color space to produce the color transformed image.

18. The image capture device of claim 17, wherein the image processor is further configured to:

transform the YCbCr color space of the denoised image to the RGB color space to produce an inverse color space transformed image.

19. The image capture device of claim 18, wherein the image processor is further configured to:

transform the inverse color space transformed image to a Bayer scale image.

20. The image capture device of claim 19, further comprising:

a memory configured to store the Bayer scale image.

* * * * *